(12) United States Patent
Kaltenmark et al.

(10) Patent No.: US 7,068,680 B1
(45) Date of Patent: Jun. 27, 2006

(54) COMMUNICATION SERVICE ARCHITECTURES FOR NETCENTRIC COMPUTING SYSTEMS

(75) Inventors: John K. Kaltenmark, St. Charles, IL (US); Michael W. Alber, Tokyo (JP); William M. Gilliland, Glendale Heights, IL (US)

(73) Assignee: Accenture LLP, Palo Alto, CA (US)

( * ) Notice: Subject to any disclaimer, the term of this patent is extended or adjusted under 35 U.S.C. 154(b) by 789 days.

(21) Appl. No.: 09/675,232

(22) Filed: Sep. 29, 2000

Related U.S. Application Data

(60) Provisional application No. 60/156,962, filed on Oct. 1, 1999.

(51) Int. Cl.
G06F 15/16 (2006.01)
(52) U.S. Cl. .................. 370/469; 709/203; 717/101
(58) Field of Classification Search ............... 370/469, 370/465, 352, 353, 466, 467; 709/227, 228, 709/203, 201, 229, 217, 219; 717/100, 101, 717/120
See application file for complete search history.

(56) References Cited

U.S. PATENT DOCUMENTS

| | | | |
|---|---|---|---|
| 4,809,170 A | 2/1989 | Leblang et al. | |
| 5,495,610 A | 2/1996 | Shing et al. | |
| 5,535,388 A | 7/1996 | Takeda | |
| 5,590,270 A | 12/1996 | Tskuda et al. | |
| 5,602,997 A | 2/1997 | Carpenter et al. | |
| 5,619,716 A | 4/1997 | Nonaka et al. | |
| 5,710,915 A | 1/1998 | McElhiney | |
| 5,737,533 A | 4/1998 | de Hond | |
| 5,742,829 A | 4/1998 | Davis et al. | |
| 5,745,753 A | 4/1998 | Mosher, Jr. | |
| 5,758,150 A | 5/1998 | Bell et al. | |
| 5,761,071 A | 6/1998 | Bernstein et al. | |
| 5,781,732 A | 7/1998 | Adams | |
| 5,799,297 A | 8/1998 | Goodridge et al. | |
| 5,805,785 A | 9/1998 | Dias et al. | |
| 5,835,090 A | 11/1998 | Clark et al. | |
| 5,859,969 A | 1/1999 | Oki et al. | |
| 5,860,012 A | 1/1999 | Luu | |
| 5,870,759 A | 2/1999 | Bauer et al. | ................ 707/201 |
| 5,877,759 A | 3/1999 | Bauer | |

(Continued)

FOREIGN PATENT DOCUMENTS

EP 0520923 A2 12/1992

(Continued)

OTHER PUBLICATIONS

Tanenbaum, A., "Computer Networks—Third Edition," pp. 28-39, Prentice Hall, Inc., USA, 1996.

(Continued)

*Primary Examiner*—Brian Nguyen
(74) *Attorney, Agent, or Firm*—Brinks Hofer Gilson & Lione

(57) ABSTRACT

A communication services architecture for a netcentric computing system is disclosed by the present invention. The communication services architecture includes a communication services layer that includes messaging services, specialized messaging services, communication security services, virtual resource services and directory services. In addition, the communication services architecture includes a transport services layer that includes message transport services, packet forwarding/Internetworking services, circuit switching services, transport security services, network address allocation services and quality of service services. A network media services layer is provided that includes media access services and physical media services.

23 Claims, 9 Drawing Sheets

U.S. PATENT DOCUMENTS

| | | | |
|---|---|---|---|
| 5,892,905 A | 4/1999 | Brandt et al. | |
| 5,905,868 A | 5/1999 | Baghai et al. | |
| 5,911,071 A | 6/1999 | Jordan | |
| 5,924,096 A | 7/1999 | Draper et al. | |
| 5,930,512 A | 7/1999 | Boden et al. | |
| 5,933,582 A | 8/1999 | Yamada | |
| 5,956,400 A | 9/1999 | Chaum et al. | 380/4 |
| 5,956,479 A | 9/1999 | McInerney et al. | |
| 5,999,931 A | 12/1999 | Breitbart et al. | 707/10 |
| 6,006,171 A | 12/1999 | Vines et al. | |
| 6,012,071 A | 1/2000 | Krishna et al. | |
| 6,023,698 A | 2/2000 | Lavey, Jr. et al. | |
| 6,029,192 A | 2/2000 | Hill et al. | |
| 6,038,560 A | 3/2000 | Wical | |
| 6,061,695 A | 5/2000 | Slivka et al. | |
| 6,067,577 A | 5/2000 | Beard | |
| 6,081,518 A | 6/2000 | Bowman Amuah | |
| 6,112,304 A | 8/2000 | Clawson | |
| 6,122,630 A | 9/2000 | Strickler et al. | 707/8 |
| 6,144,975 A | 11/2000 | Harris, Jr. et al. | |
| 6,147,975 A | 11/2000 | Bowman Amuah | |
| 6,185,573 B1 | 2/2001 | Angelucci et al. | |
| 6,195,697 B1 | 2/2001 | Bowman Amuah | |
| 6,256,773 B1 | 7/2001 | Bowman Amuah | |
| 6,289,382 B1 | 9/2001 | Bowman Amuah | |
| 6,321,263 B1 | 11/2001 | Luzzi et al. | |
| 6,324,647 B1 | 11/2001 | Bowman Amuah | |
| 6,332,163 B1 | 12/2001 | Bowman Amuah | |
| 6,339,832 B1 | 1/2002 | Bowman Amuah | |
| 6,345,239 B1 | 2/2002 | Bowman Amuah | |
| 6,366,912 B1 | 4/2002 | Wallent et al. | |
| 6,370,573 B1 | 4/2002 | Bowman Amuah | |
| 6,385,655 B1 | 5/2002 | Smith et al. | 709/232 |
| 6,401,097 B1 | 6/2002 | McCotter et al. | |
| 6,405,364 B1 | 6/2002 | Bowman Amuah | |
| 6,418,430 B1 | 7/2002 | DeFazio et al. | |
| 6,426,948 B1 | 7/2002 | Bowman Amuah | |
| 6,427,132 B1 | 7/2002 | Bowman Amuah | |
| 6,434,568 B1 | 8/2002 | Bowman Amuah | |
| 6,434,628 B1 | 8/2002 | Bowman Amuah | |
| 6,438,594 B1 | 8/2002 | Bowman Amuah | |
| 6,442,547 B1 | 8/2002 | Bowman Amuah | |
| 6,442,748 B1 | 8/2002 | Bowman Amuah | |
| 6,449,588 B1 | 9/2002 | Bowman Amuah | |
| 6,457,066 B1 | 9/2002 | Mein et al. | |
| 6,477,580 B1 | 11/2002 | Bowman Amuah | |
| 6,477,665 B1 | 11/2002 | Bowman Amuah | |
| 6,496,850 B1 | 12/2002 | Bowman Amuah | |
| 6,502,213 B1 | 12/2002 | Bowman Amuah | |
| 6,523,027 B1 | 2/2003 | Underwood | |
| 6,529,909 B1 | 3/2003 | Bowman Amuah | |
| 6,529,948 B1 | 3/2003 | Bowman Amuah | |
| 6,539,396 B1 | 3/2003 | Bowman Amuah | |
| 6,542,593 B1 | 4/2003 | Bowman Amuah | |
| 6,549,949 B1 | 4/2003 | Bowman Amuah | |
| 6,550,057 B1 | 4/2003 | Bowman Amuah | |
| 6,556,659 B1 | 4/2003 | Bowman Amuah | |
| 6,571,282 B1 | 5/2003 | Bowman Amuah | |
| 6,578,068 B1 | 6/2003 | Bowman Amuah | |
| 6,584,466 B1 | 6/2003 | Serbinis et al. | |
| 6,598,046 B1 | 7/2003 | Goldberg et al. | |
| 6,601,192 B1 | 7/2003 | Bowman Amuah | |
| 6,601,234 B1 | 7/2003 | Bowman Amuah | |
| 6,606,660 B1 | 8/2003 | Bowman Amuah | |
| 6,606,744 B1 | 8/2003 | Mikurak | 717/174 |
| 6,611,867 B1 | 8/2003 | Bowman Amuah | |
| 6,615,199 B1 | 9/2003 | Bowman Amuah | |
| 6,615,253 B1 | 9/2003 | Bowman Amuah | |
| 6,615,258 B1 | 9/2003 | Barry et al. | |
| 6,636,242 B1 | 10/2003 | Bowman Amuah | |
| 6,640,238 B1 | 10/2003 | Bowman Amuah | |
| 6,640,244 B1 | 10/2003 | Bowman Amuah | |
| 6,640,249 B1 * | 10/2003 | Bowman-Amuah | 709/228 |
| 6,662,357 B1 | 12/2003 | Bowman Amuah | |
| 6,697,824 B1 | 2/2004 | Bowman Amuah | |
| 6,704,303 B1 | 3/2004 | Bowman Amuah | |
| 6,707,812 B1 | 3/2004 | Bowman Amuah | |
| 6,715,145 B1 | 3/2004 | Bowman Amuah | |
| 6,721,713 B1 | 4/2004 | Guheen et al. | 705/1 |
| 6,742,015 B1 | 5/2004 | Bowman Amuah | |
| 2001/0052108 A1 | 12/2001 | Bowman Amuah | |
| 2002/0120553 A1 | 8/2002 | Bowman Amuah | |
| 2002/0133328 A1 | 9/2002 | Bowman Amuah | |
| 2003/0058277 A1 | 3/2003 | Bowman Amuah | |
| 2004/0030705 A1 | 2/2004 | Bowman Amuah | |
| 2004/0030749 A1 | 2/2004 | Bowman Amuah | |
| 2004/0107125 A1 | 6/2004 | Guheen et al. | 705/7 |

FOREIGN PATENT DOCUMENTS

| | | |
|---|---|---|
| EP | 0697655 A2 | 2/1996 |
| EP | 0697691 A2 | 2/1996 |
| EP | 0769739 A2 | 4/1997 |
| EP | 0810520 A1 | 12/1997 |
| EP | 0829808 A2 | 3/1998 |
| EP | 0841616 A2 | 5/1998 |
| EP | 0915422 A1 | 5/1999 |
| GB | 2315891 A | 2/1998 |
| WO | WO 92/20022 | 11/1992 |
| WO | WO 95/23373 | 8/1995 |
| WO | WO 97/12311 | 4/1997 |
| WO | WO 98/52121 | 11/1998 |
| WO | WO 98/53396 | 11/1998 |
| WO | WO 98/54660 | 12/1998 |
| WO | WO 98/57260 | 12/1998 |
| WO | WO 99/38079 | 7/1999 |

OTHER PUBLICATIONS

Ryan, H.W., Sargent, S.R., Boudreau, T.M., Arvanitis, Y.S., Taylor, S.J., Mindrum, C.; "Practical Guide to Client/Server Computing," Second Edition, pp. 1-774; Copyright 1998, CRC Press LLC, Boca Raton, FL, United States.

Ryan, H.W.; Alber, M.W.; Taylor, S.J.; Chang, R.A.; Arvanitis, Y.S.; Davis, M.C.; Mullen, N.K.; Dove, S.L.; Mehra, P.N.; Mindrum, C.; "Netcentric Computing, Computing, Communications and Knowledge," pp. 1-413; Copyright 1998, CRC Press LLC, Boca Raton, FL, United States.

Copyright Registration for Netcentric Computing: Computing, Communications and knowledge, Reg. Jan. 9, 1998, p. 1.

Kramer, D., The Java™ Platform: A White Paper, JavaSoft, pp. 1-25, May 1996.

www.empowermentzone.com/javacomp.txt, Sun Microsystems, pp. 1-18, 1996.

Engestrom, J., "Software Agents, Towards Transparent Mediation, A Technology Report for Salama Interactive," Jan. 1999, pp. 1-19.

Morris, K.C. and Flater, D., "Standards-based software testing in a Net-Centric World" pp. 1-8 (cited by Examiner, no date given).

Raje, R. and Chinnasamy, S., "Designing a distributed computing environment for global scale systems: challenges and issues," ACM SIGAPP Applied Computing Review, vol. 7, Issue 1, Spring 1999, pp. 25-30.

"Data Joiner: A Multidatabase Server Version 1," White Paper, IBM Data Management Solutions, IBM, USA, second edition (May 1995).

"Effective Systems management for DB2 Universal Database," White Paper, IBM Data Management Solutions, IBM, USA, first edition (Dec. 1996).

Abdel-Mottaleb, M., Hsiang-Lung, W., Dimitrova, N., "Aspects of Multimedia Retrieval," Philips Journal of Research, NL, Elsevier, Amsterdam, vol. 50, No. 1, 1996, pp. 227-251.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40-44.

Bank, J.S., "Java Security," Dec. 8, 1995, pp. 1-13, X-002092325.

Billy B.L. Lim, "Teaching web development technologies in CS/IS curricula," ACM, copyright 1998, pp. 107-111.

Blakeley, J.A., "Universal Data Access with OLE DB," Proceedings of IEEE Compcon, U.S. Los Alamitos, IEEE Computer Society Press, Feb. 23, 1997, pp. 2-7.

Borsook, P., "Seeking Security. Mainframe Techniques Define System Security. Soon, they'll be Adapted To Distributed Client/Server Systems." Byte, McGraw Hill, Inc., St. Peterborough, vol. 18, No. 6, May 1, 1993, pp. 119-122, 124, 12, XP000359327, ISSN 0360-5280.

Burke, M.G., Choi, J.D., Fink, S., Grove, D., Hind, M., Sarkar, V., Serrano, M.J., Sreedhar V.C., Srinivasan, H., "The Jalapeno Dynamic Optimizing Compiler for Java," Java '99, San Francisco, CA, US, ACM Jun. 12, 1999, pp. 129-141 XP002134655.

Chamberlin, D.D., "Evolution of Object-Relational Database Technology in DB2," Compcon 97 Proceedings, IEEE, 1997, pp. 131-135.

Chamberlin, D.D., "Using the new DB2: IBM's object-relational database system," Morgan Kaufmann Publishers, USA, 1996, ISBN 1-55860-373-5, pp. 561-568.

Clip, P., "Servlets: CGI The Java Way," BYTE, McGraw-Hill, Inc., St. Peterborough, US, vol. 23, No. 5, May 1, 1998, pp. 55-56.

Cramer, T., Friedman, R., Miller, T., Seberger, D., Wilson, R., Wolczko, M.,"Compiling Java Just in Time," IEEE Micro, IEEE Inc., New York, US, vol. 17, No. 3, May 1, 1997, pp. 36-43 XP000656035, ISSN: 0272-1732.

Gwetzman, J.S., Seltzer, M., "The Case For Geographical Push-Caching," Workshop on Hot Topics in Operating Systems, May 4, 1995, pp. 51-55.

Hamilton, M.A., "Java and the shift to Net-centric computer," Sun Microsystems, Computer, paper published Aug. 1996, ISSN: 0018-9162, Aug. 1996, pp. 31-39.

IBM Technical Disclosure Bulletin, "Security, License Management and Application Metering Process for Controlling Applications in the DOS Environment," IBM Corp., New York, US, vol. 37, No. 11, pp 195-199, Nov. 1, 1994.

Joshi, S.M., Veeramani, D., "Book Review. Increasing the Interoperability of CAD Packages. CAD and Office Integration: OLE for Design and Modeling—A New Technology for CA-Software," Computer Aided Design, Elsevier Publishers BV, Barking, GB, vol. 29, No. 12, Dec. 1, 1997, pp. 907.

Koved, L., Nadalin, A.J., Neal, D., Lawson, T., "The Evolution of Java Security," IBM, The Ultimate Resource for Java Developers, 1998, pp. 1-14, XP002144222.

Lambert, N., "A New Patent Search Tool For The Internet. Q-PAT US." Database, US, Cincinnati, vol. 19, No. 4, Aug. 1, 1996.

Litoiu et al., "A performance engineering tool and method for distributed applications," ACM, pp. 1-14

McDowell et al., "Unloading Java classes that contain static fields," ACM, v. 33(1), Oct. 15, 1997, pp. 56-60.

Nori, A.K., Kumar, S., "Bringing Objects to the Mainstream," Compcon '97 Proceedings, IEEE, 1997, pp. 136-142.

North, K., "Database Programming with OLE and ActiveX," DBMS, US, M&T Publ., Redwood City, CA, US, Nov. 1996, pp. 1-8.

Olson, M.A., "DataBlade extensions for INFORMIX-Universal Server," Compcon '97 Proceedings, IEEE, 1997, pp. 143-148.

Orfali, R., Harkey, D., "Client/Server Programming with OS/2 2.0 (2nd Ed.)" 1992, Van Nostrand Reinhold New York, U.S., pp. 10-24, 111-137, 149-160, 588-594, XP002164217, ISBN 0-442-01219-5.

Orfali, R., Harkey, D., "Client/Server With Distributed Objects," Byte, McGraw-Hill, Inc., St. Peterborough, U.S., vol. 20, No. 4, Apr. 1, 1995, pp. 151-152, 154, 156, XP000501827, ISSN 0360-5280.

Orfali, R., Harkey, D., Edwards, J., "Intergalactic Client/Server Computing," Byte, McGraw-Hill, Inc., St. Peterborough, U.S., vol. 20, No. 4, Apr. 1, 1995, pp. 108-110, 114, 11, XP000501823, ISSN 0360-5280.

Pleas, K., "Ole's Missing Links," BYTE, McGraw-Hill Inc., St. Peterborough, US, vol. 21, No. 4, Apr. 1, 1996, pp. 99-102 X-000586036, ISSN 0360-5280.

Schmoll, J. "Wird OLE for Process Control (OPC) Ein Neuer Industriestandard?", Automatisierungstechnische Praxis, ATP, Oldenbourg Verlag, Munchen, DE, vol. 39, No. 5, May 1, 1997, pp. 11-12, 14-17.

Smeets, J., Boyer, S., "Internet and Client Server Patent Information Systems: New Services from Derwent," World Patent Information, GB, Elsevier Sciences Publishing, Barking, vol. 20, No.2, Jun. 1998, pp. 136-139, XP004165804, ISSN 0172-2190.

Smith, D., Tilley, S.R., Weiderman, N.H., "Transforming Legacy Application into Object-Oriented Applications Workshop, Will Net-Centric Computing Change the Reengineering Equation?" 1996, pp. 1-4.

Touch, J., Hughes, A.S., "LSAM proxy cache: a multicast distributed virtual cache," Computer Networks and ISDN Systems, North Holland Publishing, Amsterdam, NL (3W3 Workshop, University of Manchester, Jun. 15-17, 1998), vol. 30,No. 22-23, Nov. 25, 1998, pp. 22-23.

Voth, G.R., Kindel, C., Fujioka, J., "Distributed Application Development for Three-Tier Architectures: Microsoft on Windows DNA," IEEE Internet Computing vol. 2, No. 2, Mar./Apr. 1998, USA.

Williams, S., Kindel, C., "The Component Object Model. The Foundation for OLE Services," Dr. Dobb's Special Report. Winter, 1994/95, vol. 19, No. 16, Dec. 21, 1994 pp. 14-22.

Zoller et al., "A toolkit for an automatic, data dictionary based connection of databases to the WWW," ACM, copyright 1998, pp. 706-718.

Copy of co-pending patent application, U.S. Appl. No. 09/386,917, filed Aug. 31, 1999; 340 pages; Inventor Michel K. Bowman-Amuah.

Copy of co-pending patent application, U.S. Appl. No. 10/647,411, filed Aug. 25, 2003; 22 pages; Inventor Michel K. Bowman-Amuah.

Copy of co-pending patent application, U.S. Appl. No. 09/387,654, filed Aug. 31, 1999; 818 pages; Inventor Michel K. Bowman-Amuah.

Tilley, S.R., Storey, M.A.D., "Repot of the STEP '97 Workshop on Net-Centric Computing," Software Engineering Institute, Carnegie Mellon University, Pittsburgh, PA pp. 1-12, CMU/SEI-97-SR-016, Oct. 1997, © 1997 by Carnegie Mellon University.

Lavva, B., Holder, O., Ben-Shaul, I., "Object Management for Network-Centric Systems with Mobile Objects," http://citeseer,ist.edu/update/613778, printed Dec. 12, 2005, © Penn State and NEC.

Farabaugh, B., "Net-Centric Computing: Architecting a Distributed Data-Management Infrastructure," Military Embedded Systems, pp. 1-14, printed from http://www.mil-embedded.com/articles/white_papers/farabaugh, printed Dec. 12, 2005, © MMV Military Embedded Systems. An OpenSystems Publication LLC publication.

Cole, B., "What is Net-Centric Computing?" Embedded.com, URL http://222.embedded.com/showArticle.jhtml?articleID=9900077, Mar. 15, 2001, © 2005 CMP Media LLC.

Cole, B., "XP and net-centric computing?" Embedded.com, URL http://www.embedded.com/showArticle.jhtml?articleID=900341, Sep. 2001.

* cited by examiner

COMMUNICATION SERVICE ARCHITECTURES FOR NETCENTRIC COMPUTING SYSTEMS

This application claims the benefit under 35 U.S.C. § 119(e) of U.S. Provisional Application Ser. No. 60/156,962, filed on Oct. 1, 1999.

FIELD OF THE INVENTION

The present invention relates generally to business computing systems, and more particularly to communication service architectures for netcentric computing systems.

BACKGROUND OF THE INVENTION

Computer based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch printed, which in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and because of these demands telecommunications groups emerged within organizations, charged with the responsibility to maintain, evolve, and manage the network over a period of time.

The theme of the 1980s was database management systems (DBMSs). Organizations used and applied database technology in the 1970s, but in the 1980s they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if they so desire. As such, a need to expand the reach of computing both within and outside the enterprise, and that enables the sharing of data and content between individuals and applications has developed.

SUMMARY OF THE INVENTION

The present invention discloses a communication services architecture for a netcentric computing system. The communication architecture includes a communication services layer, a transport services layer and a network media services layer. The communication services layer includes communication services, communication security services, virtual resource services and directory services. The transport services layer includes message transport services, packet forwarding/Internetworking services, circuit switching services, transport security services, network address allocation services and quality of service services. The network media services layer includes media access services and physical media services.

In the preferred embodiment of the present invention, the communication services of the communication services architecture includes core messaging services and specialized messaging services. The core messaging services transfer information from one application to another application in the netcentric computing system. The core messaging services may be selected from the group consisting of file transfer services, remote procedure call services, message-oriented services and streaming services. In one aspect of the present invention, the file transfer services may be selected from the group consisting of file transfer protocol services, hyper-text transfer protocol services, secure hyper-text transfer protocol services and file transfer and access management services.

As previously set forth, the communication services also include specialized messaging services. The specialized messaging services may be selected from the group consisting of E-mail messaging services, database access messaging services, object request broker messaging services, computer-telephone integration messaging services, electronic data interchange messaging services and legacy integration services.

The communication security services may be selected from the group consisting of encryption services, identification/authentication services and access control services. The identification/authentication services may be selected from the group consisting of basic ID/authentication, ID/password encryption, digital certificates, digital signatures, hardware tokens, virtual tokens and biometric identification.

In the preferred communication services architecture, the directory services include name services and domain services. The name services create a logical "pronounceable" name in place of a binary machine number on the client. The name services and the domain services can be used by other communications services. A network domain is a set of network nodes under common control (i.e., common security and logins, unified addressing, coordinated management, etc.). The domain services manage these types of activities for the network nodes in a domain.

In the preferred embodiment set forth above, the virtual resource services may be selected from the group consisting of fax services, file sharing services, paging services, phone services, terminal services, printing services and audio/video services. The terminal services may be selected from the group consisting of Telnet, 3270 emulation, tn3270, X Window System, remote control and rlogin. Those skilled in the art would recognize that various other features and advantages of the present invention exist.

Another aspect of the present invention discloses a method of providing a communication services architecture for a netcentric computing system. The method includes sharing a communication services layer including communication services, communication security services, virtual resource services and directory services with at least one client and a web server. The communication services can be broken down into core messaging services and specialized messaging services. Transporting data between the client and the web server with a transport services layer that includes message transport services, packet forwarding/Internetworking services, circuit switching services, transport security services, network address allocation services and quality of service services. In addition, the client and the web server are interconnected with a network media services layer that includes media access services and physical media services.

The present invention discloses a communication services architecture that is used to create "virtual enterprises." Although the netcentric computing system supports traditional types of data traffic, it also supports nontraditional types of data traffic (i.e.—video, sound, graphics, files) as well. The preferred communication services architecture allows an enterprise to produce the final packaged product or service and interact with their suppliers or customers through a seamless information infrastructure. In addition, the communication services architecture advantageously supports an ever-increasing base of the public that needs or desires to access the resources of the enterprise from remote locations.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS OF THE INVENTION

Figure 1:
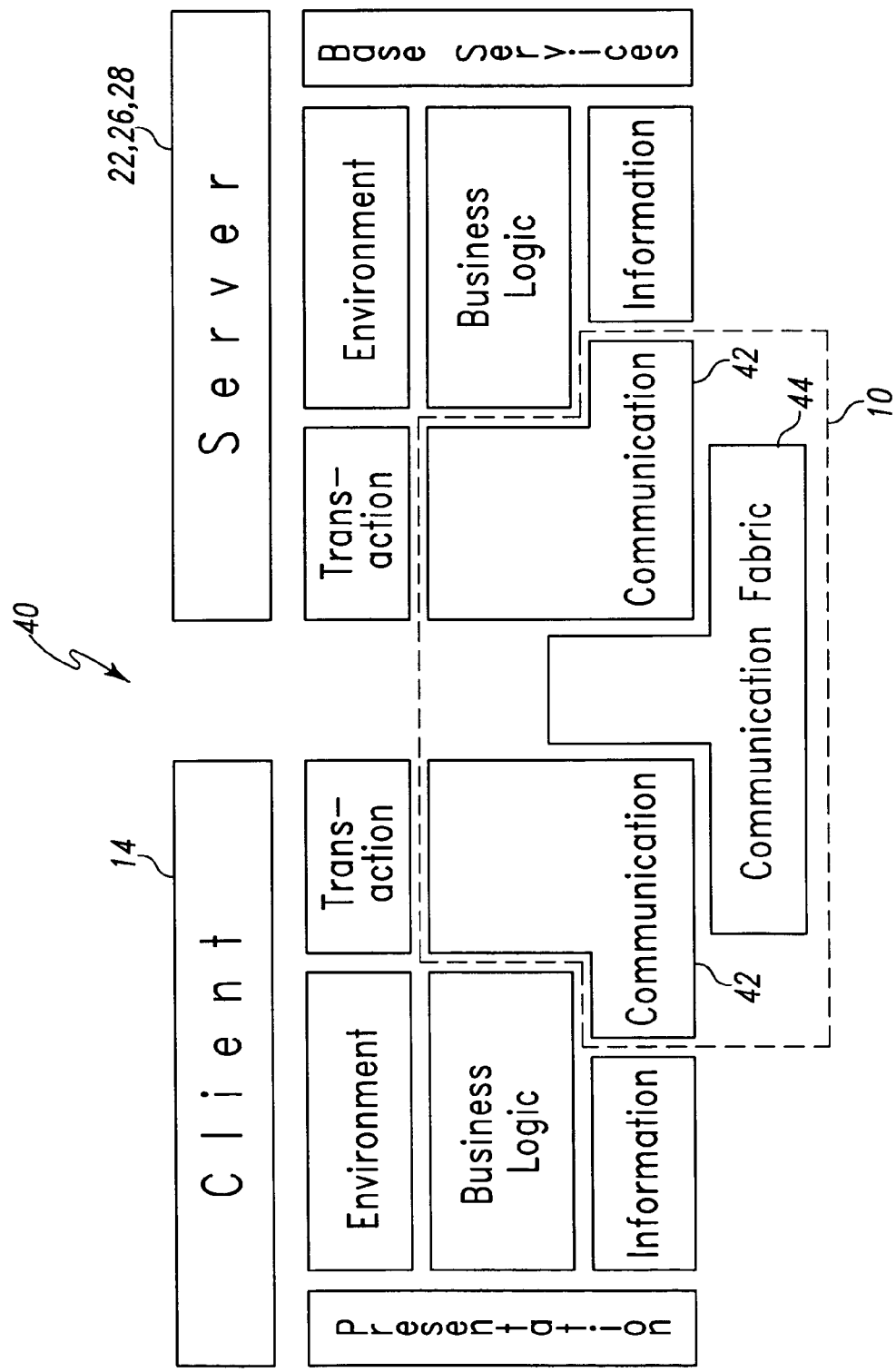
FIG. 1 illustrates a netcentric execution architecture for a netcentric computing system that includes a communication services architecture.
Figure 2:
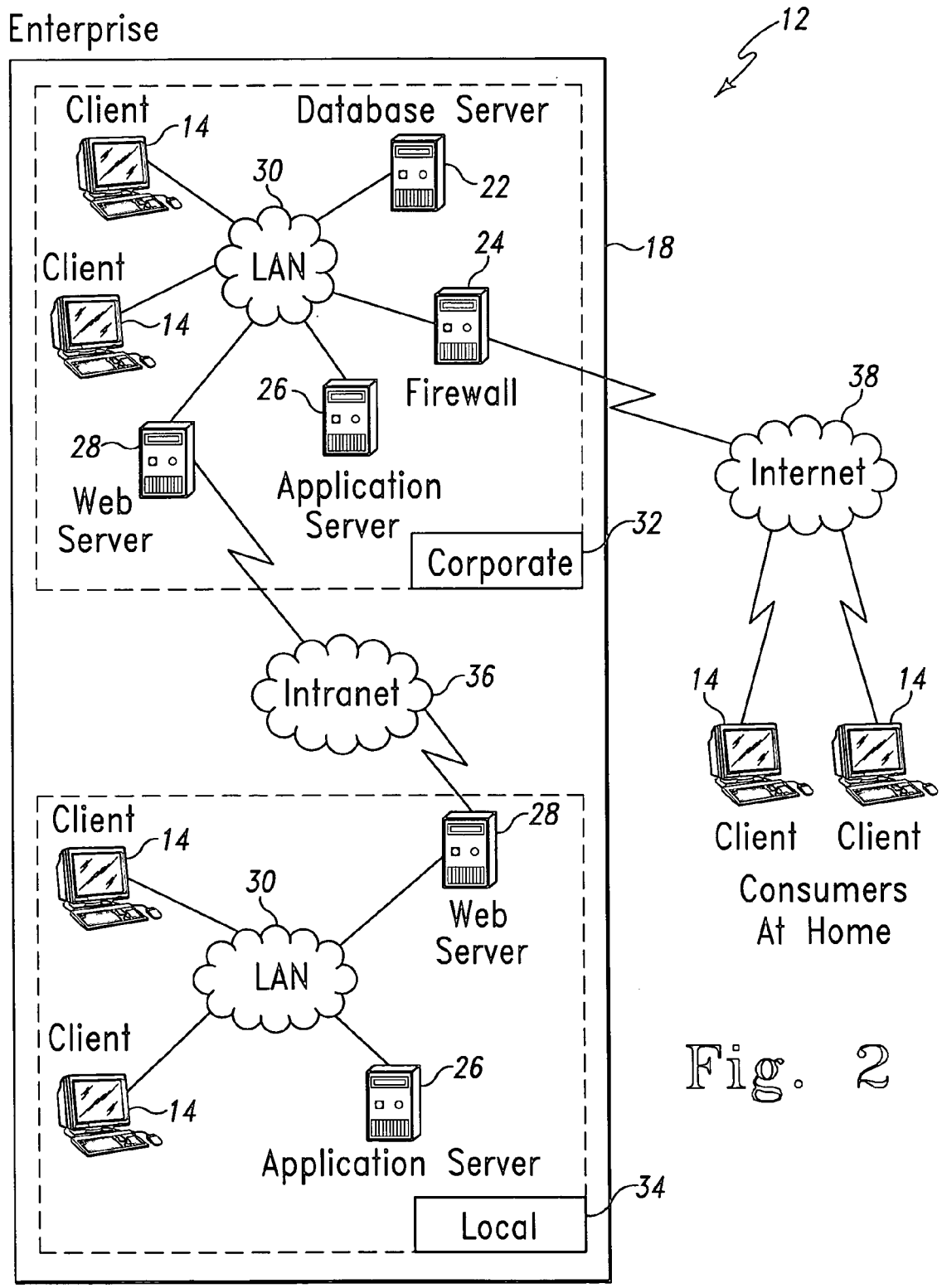
FIG. 2 illustrates an representative illustration of a netcentric computing system.

Referring to FIGS. 1 and 2, the present invention discloses a communication services architecture 10 for a netcentric computing system 12. Referring to FIG. 2, the physical picture of an illustrative netcentric computing system 12 is illustrated. In this example, a business enterprise 18 includes at least one client 14, at least one database server 22, at least one firewall 24, at least one application server 26, at least one web server 28 and a local area network (LAN) connection 30 which are generally electrically connected as illustrated in FIG. 2. As known in the art, LAN connections 30 are used to interconnect various components or computing devices that are located at a first enterprise location 32 within the business enterprise 18. Those skilled in the art would recognize that various types of LAN connections 30 exist and may be used in the present invention.

For the purpose of the present invention, the firewall 24 is used to isolate internal systems from unwanted intruders. As known in the art, firewalls 24 isolate web servers 28 from all Internet traffic that is not relevant to the netcentric computing system 12. In the preferred embodiment, the only requests allowed through the firewall 24 are for services on the web servers 28. All requests for other applications (e.g., FTP, Telnet) and other IP addresses are blocked by the firewall 24.

The web servers 28 are the primary interface to the clients 14 for all interactions with the applications or services of the netcentric computing system 12. The main task of the web servers 28 is to authenticate the clients 14, establish a secure connection from the clients 14 to the web servers 28 using encrypted messages, and allow applications the clients 14 are using to transparently access the resources of the netcentric computing system 12. The web servers 28 are responsible for accepting incoming HTTP messages and fulfilling the requests. For dynamic HTML page generation, requests are forwarded to the application servers 26. During operation, static pages, such as help pages, are preferably generated by the web servers 28. As set forth below, for the purpose of the present invention, unless otherwise specified, the term client should be construed to include both remote clients and local clients.

In the preferred embodiment, the primary function of the application servers 26 is to provide a link through which the web servers 28 can interact with the clients 14, trigger business transactions, and send back resulting data to the clients 14. A fundamental role of the application servers 26 is to manage the logical flow of the transactions and keep track of the state of sessions. For a given transaction, the application servers 26 and the web servers 28 are responsible for managing all aspects of sessions. A session is a period of time in which a client 14 is interacting with, and using, a resource of the netcentric computing system 12.

Further, in the preferred embodiment of the present invention, the main purpose of the database servers 22 is to handle an application log, which stores all application related data. Audit trails are also logged in the application log. All requests sent to the web servers 28 and application servers 26, as well as their respective responses, can be logged in the application log if necessary. The audit trails are preferentially used for traceability. In the preferred embodiment, requests are logged in the application log directly by the application server 26. Those skilled in the art would recognize that any number of data items can be monitored and kept track of by the application log.

As further illustrated in FIG. 2, a second business enterprise location 34 may be connected with the first business enterprise location 32 using an intranet connection 36. Those skilled in the art would recognize that various intranet connections 36 exist and may be used in the present invention. As those skilled in the art would recognize, the intranet connection 36 allows the computing resources of the second business enterprise location 34 to be shared or connected with the computing resources available at the first business enterprise location 32. Although not illustrated, several other enterprise locations, each containing its own computing resources, may be connected with the netcentric computing system 12.

In the embodiment illustrated in FIG. 2, the firewall 24 of the first business enterprise location 32 is connected with a dedicated Internet connection 38 to a plurality of remote clients 14. Preferentially, the remote clients 14 that are connected to the Internet connection 38 access data at the business enterprise 18 through the Internet connection 38 using a browser application. The Internet connection 38 gives the remote clients 14 the ability to gain access to applications, information and data content that may be located on the database server 22, the application server 26 and the web server 28.

Figure 3:
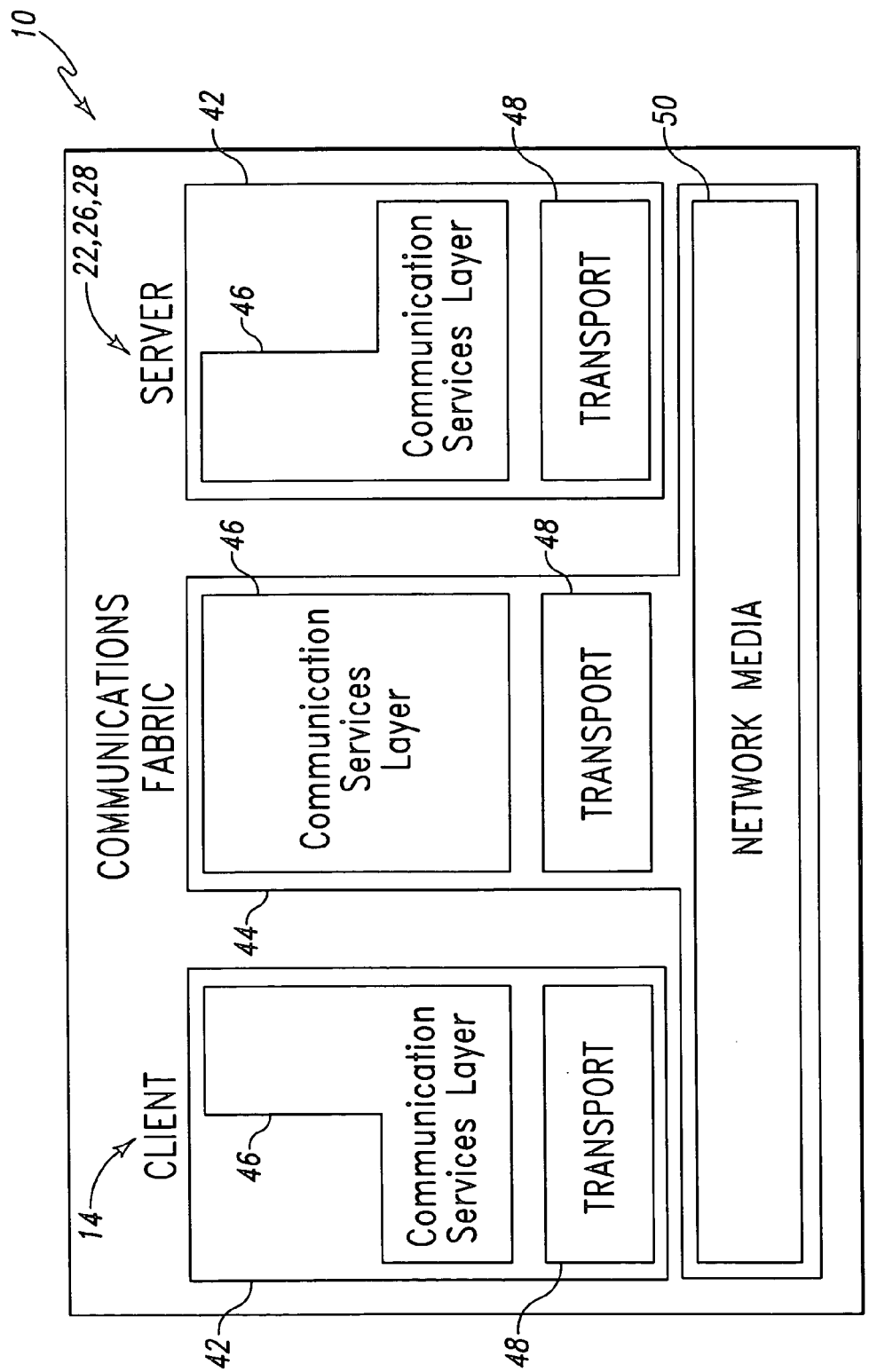
FIG. 3 illustrates a portion of the communication services architecture.

Referring back to FIG. 1, the present invention discloses a communication service architecture 10 for a netcentric execution architecture 40 that is used in a netcentric computing system 12. As illustrated, the communications service architecture 10 includes a communication layer 42 and a communication fabric layer 44. As illustrated in FIG. 3, the communication layer 42 and the communications fabric layer 44 allow the clients 14 to communicate (i.e.—transfer data or messages) with the servers 22, 26, 28 of the netcentric computing system 12 during operation. For a detailed discussion of the remaining elements of the netcentric execution architecture 40 as well as the netcentric computing system 12, refer to co-pending U.S. patent application Ser. No. 09/676,227 entitled ARCHITECTURES FOR NETCENTRIC COMPUTING SYSTEMS, which was filed on Sep. 29, 2000 and is hereby incorporated by reference, in its entirety.

Referring to FIG. 3, a breakdown of the network-specific layers of the preferred communication services architecture 10 is illustrated. The communication services architecture 10 includes a communications services layer 46, a transport layer 48 and a network media layer 50. Each layer 46, 48, 50 contains specific network-related devices and services that are needed to deliver the necessary functionality required by the preferred netcentric execution architecture 40 that drives the netcentric computing system 12. As illustrated in FIG. 3, the communication layers 42, on both the client 14 and server 22, 26, 28, includes the communication services layer 46 and the transport layer 48. The communications fabric layer 44 includes the communication services layer 46, the transport layer 48, and the network media layer 50.

In order to be fully functional, the preferred communication services architecture 10 require services from all three network layers 46, 48, 50 of the communication services architecture 10. Within each of the layers 46, 48, 50 individual services are provided that selectively deliver the necessary functionality of the preferred communication services architecture 10. As set forth in greater detail below, the services provided in communications services layer 46, the transport layer 48 and the network media layer 50 enable applications and higher-level services provided by the netcentric computing system 12 to be isolated from the intricacies of the low-level network (e.g., developing application interfaces directly with complex communications protocols).

In the preferred embodiment, the communication services layer 46 manages the interaction of distributed processes over the netcentric computing system 12. The communications services layer 46 enables an application to interact transparently with other applications regardless of where the application resides or where the client 14 is located. The communication services layer 46 performs four distinct functions: manages communications between applications; initiates and manages the transfer of information between processes over the netcentric computing system 12; provides specialized interface and communication management capabilities based on the type of resource accessed so that network nodes can intelligently interact with distributed resources; and provides interfacing and translation to ensure that information received is in a readable format for the local system. For the purpose of the present invention, the term node should be broadly interpreted to include both clients and servers as well as various other computing devices. As illustrated in FIG. 3, the communication services layer 46 makes up a part of the communication layer 42 and the communications fabric layer 44 in the preferred embodiment.

The transport layer 48 provides the capability of transferring data through the netcentric computing system 12 to the ultimate destination. The primary function of the transport layer 48 includes transporting data (including reliability, security and quality of service) and transporting voice calls. As such, the transport layer 48 is the portion of the communication services architecture 10 that transfers information across the netcentric computing system 12 from clients 14 to servers 22, 26, 28, and vice versa. As illustrated in FIG. 3, a portion of the transport layer 48 is included in the communications layer 42 and the communications fabric layer 44.

The network media layer 50 performs the low-level transfer of data between network nodes, using physical media such as wiring. The primary functions of the network media layer 50 include performing low-level transfer of data between network nodes (i.e., clients and servers), managing low-level signaling across physical media, physical wiring, cabling and radio frequency spectrum. In essence, without the network media layer 50, information would not be capable of traveling to its intended destinations. As such, as illustrated in FIG. 3, the network media services layer 50 is primarily used as a part of the communications fabric layer 44, but is also used to connect the clients 14 with the servers 22, 26, 28.

Figure 4:
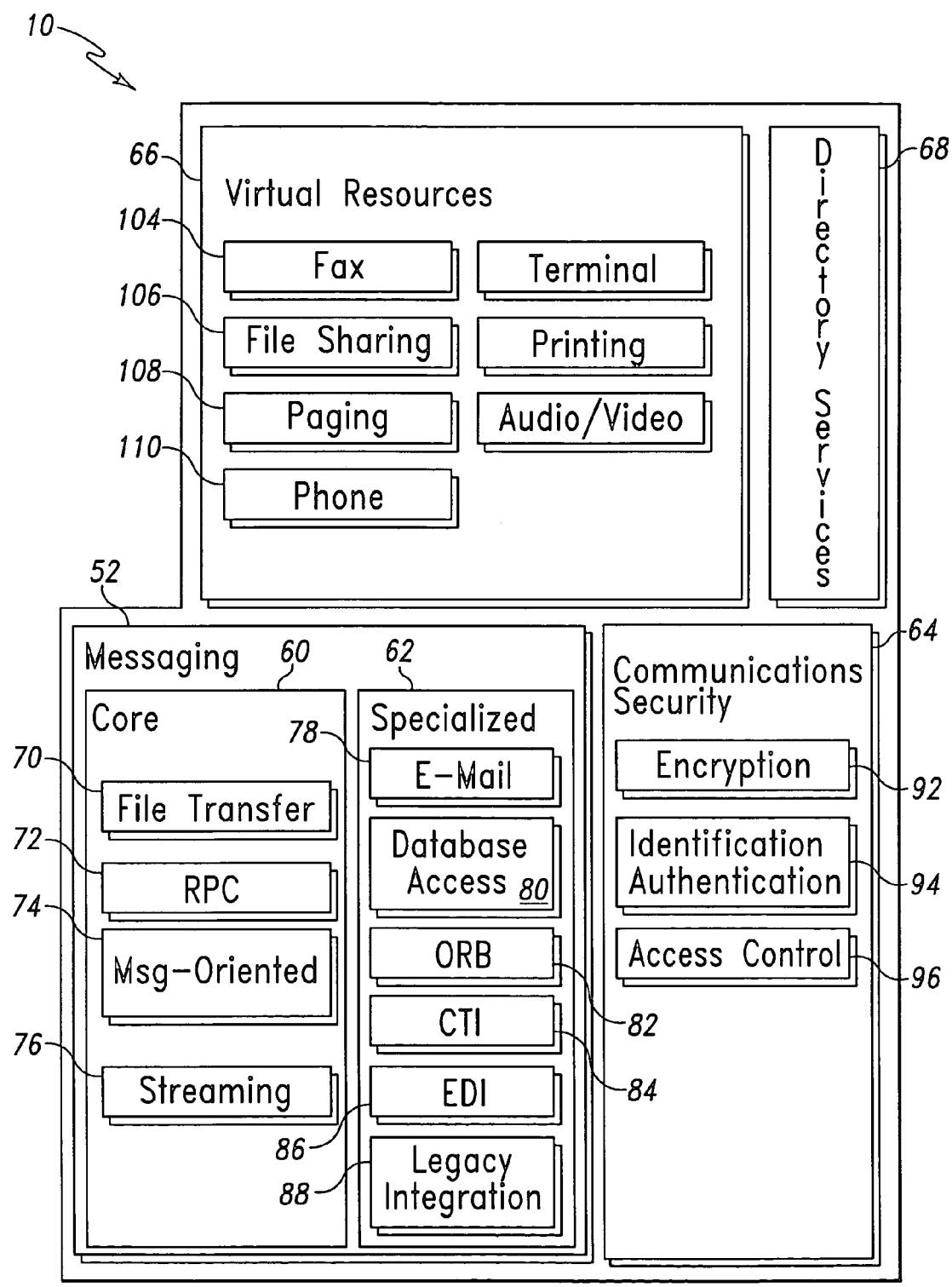
FIG. 4 illustrates the preferred communications services layer.

The communication services layer 46 enables applications to interact transparently with other applications, regardless of whether they reside on the same client 14 or on a remote server 22, 26, 28. Referring to FIG. 4, the preferred communication services layer 46 includes communication services 52, communication security services 64, virtual resource services 66 and directory services 68. As illustrated, the communication services 52 include core messaging services 60 and specialized messaging services 62. Each of the services set forth above will be discussed in detail in the following sections. Those skilled in the art would recognize that the term service, as used herein, should be broadly construed to include software applications that are written to perform particular functions.

The communication services 52 perform the process of sending information or commands between two or more recipients. Recipients may be clients, people, or processes within a client 14 that is connected with the netcentric computing system 12. To send this message, a protocol (or in come cases, multiple protocols) is used that both the sender and receiver can understand. As known in the art, a protocol is a set of rules describing, in technical terms, how two end points should exchange information. Protocols exist at several levels during the exchange of information. Protocols facilitate transport of the message carrying the information. Both end points must recognize and observe the protocol. As an example, one of the most widely used protocols in today's networks is the TCP/IP protocol, which is commonly used by the Internet.

In the preferred embodiment, the core messaging services 60 transfer formatted information from one process or application to another process or application. By drawing upon the core messaging services 60, applications can shield themselves from the complexity of the transport layer 48. There are three key messaging styles used to support interprocess communication in the core messaging services 60: store and forward, synchronous and asynchronous messaging.

Store and forward messaging provides a deferred message processing. For example, store and forward messaging may use an e-mail infrastructure upon which to build applications. Common uses would be for forms routing and e-mail. Synchronous messaging allows an application to send a message to another application and wait for a reply before continuing. Synchronous messaging is typically used for update and general business transactions. It requires time-out processing to allow the application to reacquire control in the event of failure.

Asynchronous messaging allows an application to send a message to another application and continue processing before a reply is received. Asynchronous messaging is typically used for larger retrieval-type processing, such as retrieval of larger lists of data than can be contained in one message.

Messaging styles are important because they serve as the primary link to the application and business requirements. For example, suppose a business process requiring a series of processing steps needs to be automated. Additionally, each step needs to be performed in sequence at real time. Before continuing to the next step of the process, an application must know if the previous step was successful. Because of the send, receive, continue nature of the business process, the more appropriate messaging style for this application is synchronous messaging.

In addition to the messaging styles, interprocess messaging is typically implemented in one of two ways: 1) function based, which uses the subroutine model of programming in which the message interface is built upon the calling program passing the appropriate parameters and receiving the returned information and 2) message based, which uses a defined message format to exchange information between processes. While a portion of the message may be unstructured, a defined header component is normally included. A message-based approach is not limited to the call/return structure of the function-based model and can be used in a conversational manner.

Figure 5:
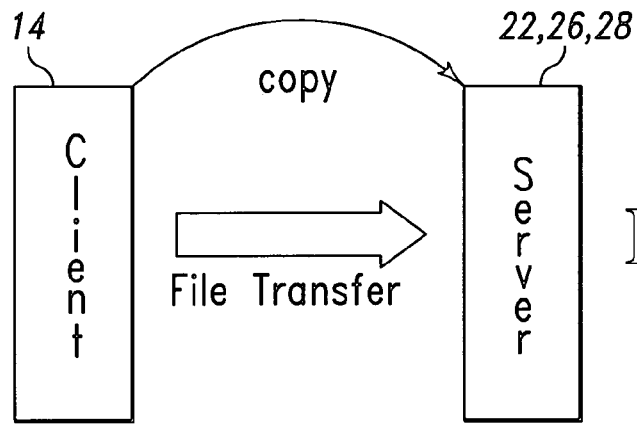
FIG. 5 illustrates an example of a preferred file transfer service.

The core messaging services 60 include file transfer services 70, remote procedure call (RPC) services 72, message-oriented services 74 and streaming services 76. The file transfer services 70 use applications to enable the copying and receiving of files or other large blocks of data between resources or devices of the netcentric computer system 12. As illustrated in FIG. 5, during this process a file is copied from one resource or node (client 14) to another resource or node (web server 28). As such, the file transfer services 70 transfer a copy of a file to the resulting resource receiving the file, which results in a copy of the file on both machines.

In the present preferred embodiment of the invention, the file transfer services 70 include file transfer protocol (FTP) services, hyper-text transfer protocol (HTTP) services, secure hyper-text transfer protocol (S-HTTP) services, and file transfer and access management (FTAM) services. FTP services allow users to upload and download files across the netcentric computing system 12. FTP services also provide a mechanism to obtain file name, directory name, attributes and file size information. Remote file access protocols such as Network File System (NFS) also use a block transfer method, but are optimized for on-line read/write paging of a file.

Within a Web-based environment, web servers 28 transfer HTML pages to clients 14 using HTTP. HTTP services can be thought of as a lightweight file transfer protocol optimized for transferring small files. HTTP services reduce the inefficiencies of the FTP protocol. HTTP services run on top of TCP/IP and was developed specifically for the transmission of hypertext between client 14 and server 22, 26, 28.

S-HTTP services are a secure form of HTTP services, which would mostly used for financial transactions on the netcentric computing system 12. S-HTTP services are used because of the ability to conduct financial transactions (using credit card numbers or passing sensitive information) without the risk of unauthorized people intercepting this information. S-HTTP services incorporate various cryptographic message formats such as DSA and RSA standards into both the web client and the web server. FTAM services use the Open Systems Interconnection (OSI) standard, which may also be is used for file transfer, file access and file management across platforms.

Figure 6:
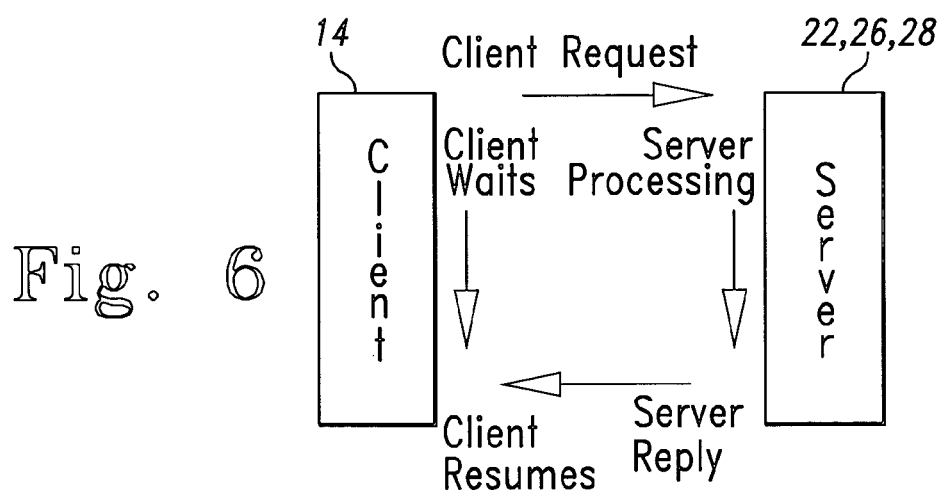
FIG. 6 illustrates an example of a remote procedure call service.

Remote procedure call (RPC) services 72 is a type of transfer protocol by which an application sends a request to a remote system (i.e.—client or server) to execute a designated procedure using the supplied arguments and return the result to the application. FIG. 6 depicts RPC messaging, in which the message originator stops processing while waiting for a reply. RPCs emulate the function call mechanisms found in procedural languages (e.g., the C language). This means that control is passed from the main logic of a program to the called function, with control returning to the main program once the called function completes its task. Because RPC services 72 perform this mechanism across the network, they pass some element of control from one process to another, for example, from the client 14 to the server 22, 26, 28. Because the client 14 is dependent on the response from the server 22, 26, 28, it is normally blocked from performing any additional processing until a response is received. This type of synchronous data exchange is also referred to as blocking communications.

The message-oriented services 74 handle the process of distributing data and control through the exchange of records known as messages. In operation, the message-oriented services 74 provide the application developer with a set of simple verbs (e.g., connect, send, receive, and disconnect) that are used to exchange information with other distributed applications on the netcentric computing system 12. For example, to send data to a remote process or application, the application developer uses a send verb. This verb, along with the appropriate parameters (e.g., data to be sent and the process's logical name), are included as part of the application code.

Once the verb is called, the message-oriented services 74 are responsible for managing the interface to the underlying communications architecture via the communications protocol APIs and ensuring the delivery of the information to the remote process or application. This interface may require that the message-oriented services 74 have the following capabilities: translating mnemonic or logical process names to operating system compatible format; opening a communications session and negotiating parameters for the session; translating data to the proper format; transferring data and control messages during the session; recovering any information if errors occur during transmission; and passing results information and status to the application.

An application continues processing after executing a message-oriented services verb, allowing the reply to arrive at a subsequent time. Thus, unlike the remote procedure call services 72, the message-oriented services 74 implement a "non-blocking" messaging architecture. In general, there are three types of message-oriented services 74 that may be implemented in the communication services architecture 10, which are: message passing services; message queuing services; and publish and subscribe services.

Figure 7:
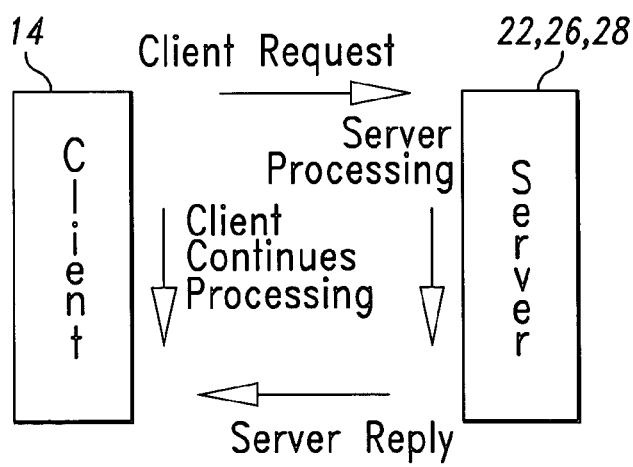
FIG. 7 illustrates an example of message passing.

As illustrated in FIG. 7, the message passing services are a direct, application-to-application communication model. An application request is sent in the form of a message from one application to another. The communication method can be either synchronous (in this case, the sending application waits for a response back from the receiving application, like RPCs) or asynchronous (through call-back routines). In a message-passing model, a direct link between two applications that participate in the message exchange is always maintained.

Figure 8:
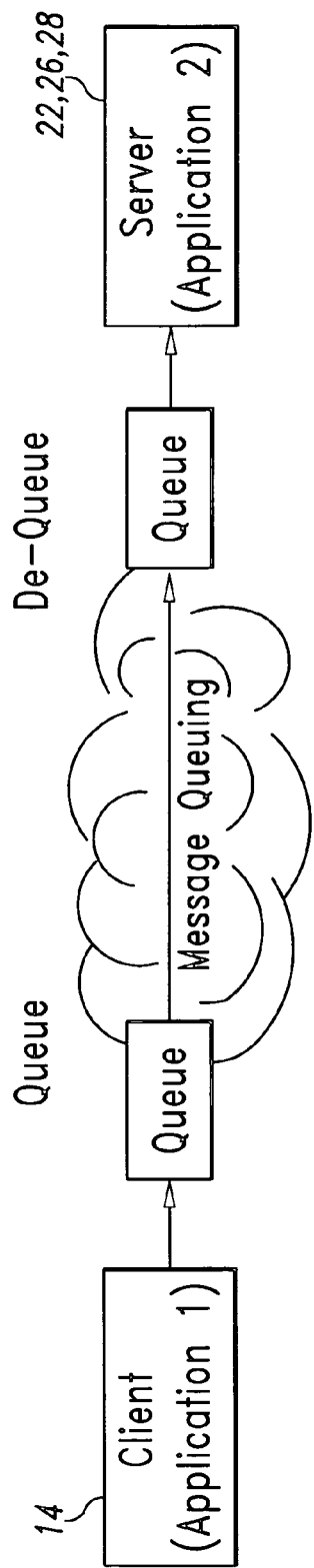
FIG. 8 illustrates an example of message queuing.

Referring to FIG. 8, the message queuing services (also known as store and forward) are an indirect application-to-application communication model that allows applications to communicate via message queues rather than by calling each other directly. Message queuing is asynchronous by nature and connectionless, meaning that the recipient need not be directly available when the message is sent. Moreover, it provides support for reliable, guaranteed and assured (non-duplicate) message delivery.

Figure 9:
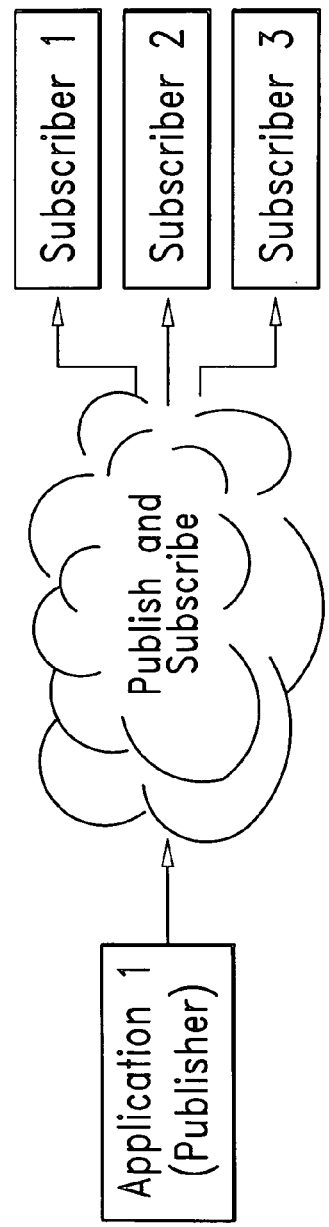
FIG. 9 illustrates an example of publish and subscribe messaging.

As illustrated in FIG. 9, the publish and subscribe services (also known as Push messaging) are a special type of data delivery mechanism that allows processes to register an interest in (i.e., subscribe to) certain messages or events. An application, which may be on the client 14, then sends (publishes) a message, which is then forwarded to all processes that subscribe, which are typically servers.

Figure 10:
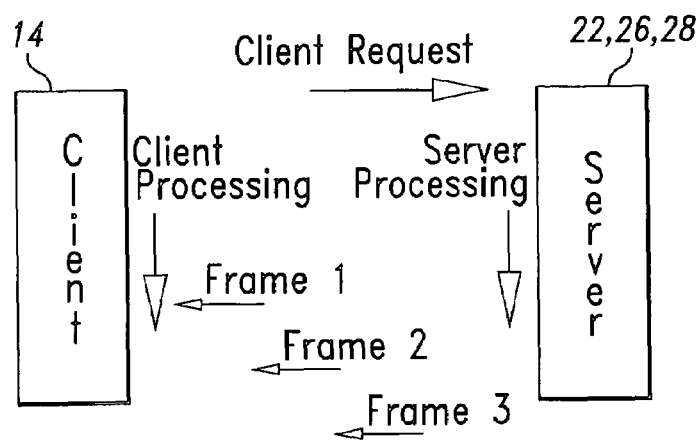
FIG. 10 illustrates streaming services.

The streaming services 76 use applications that transfer time-sensitive data streams (e.g., video and/or audio) in real time. Referring to FIG. 10, streaming differs from the other types of core messaging services 60 in that it delivers a continuous, one-way stream of data, rather than the relatively short messages of the other types of core messaging services 60. While the media stream is one-way from the server 22, 26, 28 to the client 14, the client 14 can issue stream controls to the server 22, 26, 28 as well. In the preferred embodiment, the streaming services 76 can be used to deliver video, audio, and/or other real-time content across the Internet or within the netcentric computing system 12.

During operation, the streaming services 76 may be used by different types of applications and may transfer information in one of several different types of streaming protocols. In the preferred embodiment, the streaming protocols are selected from the group including real-time streaming protocol (RTSP), real-time transport protocol (RTP) and real-time control protocol (RTCP). RTSP is the proposed Internet protocol for establishing and controlling on-demand delivery of real-time data. For example, clients can use RTSP to request specific media from a media server, to issue commands such as play, record and pause, and to control media delivery speed. Because RTSP simply controls media delivery, it is layered on top of other protocols.

In RTP actual delivery of streaming data occurs through real-time protocols such as RTP. RTP provides end-to-end data delivery for applications transmitting real-time data over multicast or unicast network services. RTP conveys encoding, timing and sequencing information to allow receivers to properly reconstruct the media stream. RTP is independent of the underlying transport service, but it is typically used with UDP. It may also be used with Multicast UDP, TCP/IP or IP Multicast. RTP is augmented by the RTCP. RTCP allows nodes to identify stream participants and communicate about the quality of data delivery.

As illustrated in FIG. 10, a key attribute of any streaming architecture is the adherence to a flow of time-sequenced data packets. Each series of packets contains the necessary information to play the next segment in a sound or video clip. FIG. 10 highlights the one-way, time-sequenced nature of the flow of data packets for a streaming architecture.

Referring once again to FIG. 4, the specialized messaging services 62 extend the core messaging services 60 to provide additional functionality to the communication services 52. Preferentially, the specialized messaging services 62 are designed to extend core messaging services 60 in the following general ways: providing messaging among specialized messaging systems by drawing upon basic messaging capabilities; defining specialized message layouts; defining specialized intersystem protocols; suggesting ways in which messaging draws upon directory and security services to deliver a complete messaging environment.

In the preferred embodiment of the present invention, the specialized messaging services 62 preferentially include the following sub-services: E-mail messaging services 78, database access messaging services 80, object request broker messaging services 82, computer-telephone integration messaging services 84, electronic data interchange messaging services 86 and legacy integration messaging services 88. The E-mail messaging services 88 exchange messages using the store-and-forward messaging style. As known in the art, some E-mail messaging services 88 traditionally include a rudimentary form of directory services.

Some E-mail products known in the art use proprietary protocols, the following are examples of E-mail related standards that may be used by the present invention: X.400, Simple Mail Transfer Protocol (SMTP), Multi-Purpose Internet Mail Extensions (MIME), Post Office Protocol (POP) and Internet Message Access Protocol, Version 4 (IMAP4). The X-400 sage handling system standard defines a platform independent standard for store-and-forward message transfers among mail servers. X.400 is often used as a backbone e-mail service, with gateways providing interconnection with end-user systems.

SMTP is a UNIX/Internet standard for transferring e-mail among servers. MIME is a protocol that enables Internet users to exchange multimedia e-mail messages. POP or POP3 is used to distribute e-mail from an SMTP server to the actual recipient.

IMAP4 allows a client 14 to access and manipulate e-mail messages on a server 22, 26, 28. IMAP4 permits manipulation or remote message folders, called "mailboxes," in a way that is functionally equivalent to local mailboxes. IMAP4 also provides the capability for an off-line client 14 to resynchronize with the server 22, 26, 28. IMAP4 includes standards for message handling features that allow users to download message header information and then decide which e-mail message contents to download.

The database access messaging services 80 use applications to provide connectivity for clients 14 to access databases throughout the netcentric computing system 12. Database messaging applications draw upon basic inter-process messaging capabilities (e.g., RPCs) to support database connectivity. DBAM can be grouped into one of three categories: open; native; and gateway. Open database messaging services typically provide single applications seamless access to multiple data sources, both relational and non-relational, through a standard application programming interface (API) set. Examples include ODBX (Open Database Connectivity) and JDBC (Java Database Connectivity). ODBC is considered an industry de facto standard.

By contrast, native database messaging services are those services, usually proprietary, provided by the DBMS vendor. Examples include SQL*Net for Oracle DBMS and DB-LIB for Sybase DBMS. Additionally, gateway database messaging services can be used to facilitate migration of data from one environment to another. For example, if data in a DB2 environment needs to be integrated with data in a Sybase environment, Gateway DBAM can enable the integration.

The object request broker messaging services 82 enable objects to transparently make requests of and receive responses from other objects located locally or remotely. Objects communicate through an ORB. An ORB enables client 14 objects to access server 22, 26, 28 objects either locally or remotely over a network and invoke operations (i.e., functions and methods) on the objects.

ORBs typically provide interoperability between heterogeneous client and server environments across languages and/or operating systems and/or network protocols. In that respect, some have said that ORBs will become a kind of "ultimate middleware" for truly distributed processing. A standardized Interface Definition Language (IDL) defines the interfaces that applications must use to access the ORB services. The two major Object Request Broker standards/implementations are Object Management Group's Common object Request Broker Architecture (CORBA) (www.omg.org); Microsoft's (Distributed) Component Object Model (COM/DCOM) (www.microsoft.com).

Figure 11:
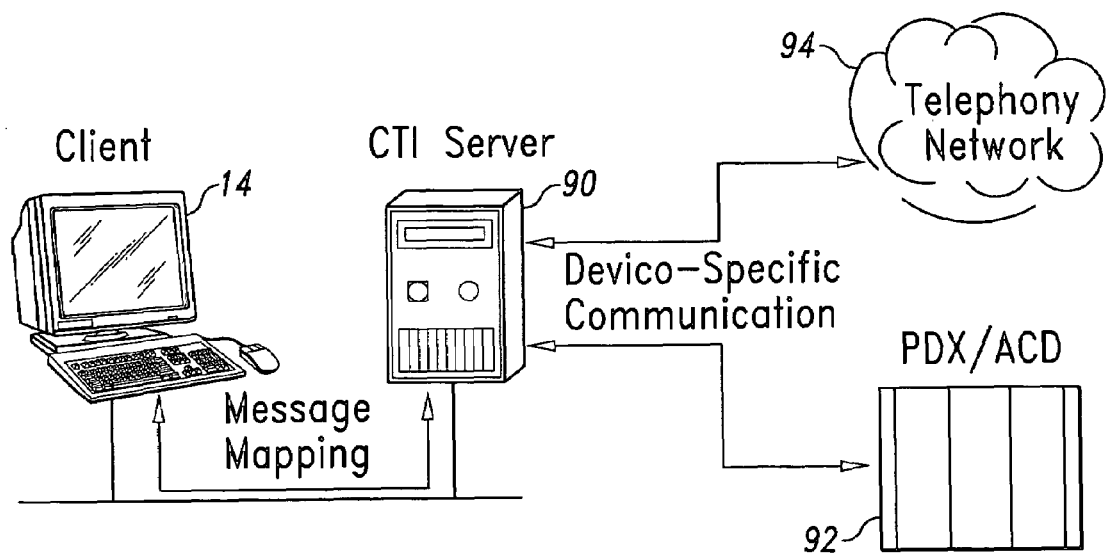
FIG. 11 illustrates computer-telephone integration messaging services that may be incorporated into the preferred communication services architecture.

The computer-telephone integration (CTI) messaging services 84 use applications to integrate computer systems (i.e., client 14) and telephone systems, thereby coordinating data and telephony activities. As illustrated in FIG. 11, in the preferred embodiment of the present invention the CTI messaging services 84 support communication among clients 14 and a CTI server 90, which then supports device specific communication, such as PBXs/ACDs 92, a plurality of networks and external telephony devices and hybrid systems (not illustrated). CTI messaging services 84 rely upon proprietary PBX/ACD APIs, CTI vendor-specific APIs or message sets, and industry-standard APIs. In the preferred embodiment, the computer-telephone integration (CTI) messaging services 84 provide two primary functions: device-specific communication and message mapping.

Device-specific communication manages direct communications between telephony devices and data devices; allows applications to control PBXs, key telephone systems, ISDN, analog PSTN, cellular, Centrex, etc. and supports features such as address translation, call set-up, call answering, call dropping, and caller ID; provides interface to carrier networks for call delivery and call-related messaging. Message mapping translates device-specific communication to generic API and/or message set.

CTI products can be divided into the following categories: CTI platform-specific products; CTI telephony-based API products; CTI server/workstation-based or host-based API products; CTI cross-platform vendors; CTI enabling solutions and CTI enterprise solutions. CTI platform-specific products are only implemented on the hardware of a specific vendor. CTI telephony-based API products include proprietary PBX/ACD-based messaging sets, which permit external devices to interface with the vendor's PBX/ACD call and station control logic.

CTI server/workstation-based or host-based API products operate on a particular computer vendor's hardware platform and provide call control and messaging functionality. CTI cross-platform vendors are products that have been ported to multiple hardware platforms/operating systems. CTI enabling solutions focus solely on call control and call/application synchronization functions. CTI enterprise solutions provide all CTI business functions to varying degrees.

The electronic date interchange messaging services 86 use applications to support system-to-system messaging among business partners by defining standard message layouts. Companies typically use electronic data interchange messaging services 86 to streamline commercial transactions within their supply chains. EDI standards (e.g., EDIFACT, ANSI X12) define record layouts for transactions such as "purchase orders." EDI services include the generation and translation of EDI messages according to the various public message layout standards. EDI messaging can be implemented via electronic mail or customized message-oriented architectures.

The legacy integration messaging services 88 use applications to provide gateways to mainframe legacy systems so that outdated messaging services can be integrated into the preferred embodiment of the present invention if required. Design techniques for integration with the netcentric computing system 12 can be grouped into two broad categories: front-end access—access of information through screens/windows; and, back-end access—this approach tends to be used when existing data stores have information that is needed in the client/server environment, but accessing the information through existing screens or functions is not feasible. The legacy integration messaging services 88 typically include remote data access through gateways. A database gateway provides an interface between the client/server environment and the legacy system. The gateway provides an ability to access and manipulate the data in the legacy system.

As previously set forth, the communication services layer 46 also includes communication security services 64. The communication security services 64 use applications to control access to network-attached resources of the netcentric computing system 12. Combining communication security services 64 with security services in other parts of the netcentric computing system 12 (e.g., application and database layers) results in robust security. The preferred communication security services 64 include encryption services 92, identification/authentication services 94 and access control services 96.

Encryption services 92 are applications that encrypt data prior to network transfer to prevent unauthorized interception. The encryption services 92 may be used in conjunction with the communication services layer 46, the transport services layer 48 or the network media services layer 50. See FIG. 3. Within the communication services layer 46, encryption occurs at the top of the protocol stack and is typically performed in an application (e.g.—in an email application). This is an end-to-end approach that can leave the transport services layer 48 and the network media services layer 50 unaffected. Several encryption services 92 exist that may be readily used in the preferred communication services architecture 10.

The identification/authentication services 94 verify network access requests by validating that users are who they claim to be. For secure netcentric computing systems 12, one or more application can be used to validate authorized users and can be integrated with the access control services 96 to verify to which functions and data the users have access. Within the corporate network, the identification/authentication services 94 are often included in directory services products like Novell's NDS (NetWare Directory Services) or Microsoft's Windows NT Domain Services. These products require the user to have an established account and supply a password before access is granted to resources through the directory.

Some of the preferred identification/authentication services 94 used in the communication services architecture 10 include basic ID/authentication, ID/password encryption, digital certificates or signatures, hardware tokens, virtual tokens and biometric identification. Basic ID/authentication requires the client 14 to supply a user name and password before the server 22, 26, 28 services a request. Basic ID/authentication does not encrypt the password in any way, and thus the password travels in the clear over the network where it could be detected with a network sniffer program or device. Basic ID/authentication is not secure enough for banking applications or anywhere where there may be a financial incentive for someone to steal someone's account information.

ID/Password encryption offers a somewhat higher level of security by requiring that the user name and password be encrypted during transit. The user name and password are transmitted as a scrambled message as part of each request because there is no persistent connection open between the client 140 and the web server 28. Digital certificate or signatures are encrypted digital keys that are issued by a third party "trusted" organization (i.e., Verisign). They are used to verify a user's authenticity.

Hardware tokens are small physical devices that may generate a one-time password or that may be inserted into a card reader for ID/Authentication purposes. Virtual tokens are typically a file on a floppy or hard drive used for ID/Authentication (e.g., Lotus Notes ID file). Biometric identification involves the analysis of biological characteristics (such as fingerprints, voice recognition, or retinal scans) to verify an individual's identity. Those skilled in the art would recognize that other authentication services may be used in the present invention.

The access control services 96 use applications to verify network access requests by validating that users are who they claim to be. For secure netcentric computing systems 12, one or more authentication mechanisms can be used to validate authorized users and to verify which functions and data they have access to. When a user requests access to resources on the netcentric computing system 12, the access control services 96 determine if the user has the appropriate permission or privileges and either allows or disallows the access. (This occurs after the user has been properly identified and authenticated.)

The following are examples of ways to implement access control services 96 within the communication security services 64. Network operation systems are bundled with all network operating systems to control user access to network resources and may be used in the present invention. An application-level proxy, or application-level gateway, is a robust type of firewall. (A firewall is a system that enforces access control policy between a trusted internal network and an untrusted external network.) The application proxy acts at the application level rather than the network level. The proxy acts as a go-between for the end user by completing the user-requested tasks on its own and then transferring the information to the user. The proxy manages a database of allowed user actions, which it checks prior to performing the request.

World Wide Web filters can prevent users from accessing specified content or Internet addresses. Products can limit access based on keywords, network addresses, time-of-day, user categories, etc. Filters are typically implemented on a firewall. Servers, applications and databases can use authentication applications locally on a server to limit access to specific system resources or files. Applications and databases can also authorize users for specific levels of access within their control. (This functionality is within the Environment Services grouping in the execution architecture.) Those skilled in the art would recognize that other authentication services may be used in the present invention.

Referring once again to FIG. 4, the directory services 68 manage information about resources on the netcentric computing system 12 and perform a variety of processes. The processes range from simple name-to-address resolution (e.g., when www.ac.com is typed in a browser connected to the Internet, that name resolves to IP address 204.167.146.195.) to the logical integration of heterogeneous systems to create a common view of resources.

In the preferred communication services architecture 10, the directory services 68 typically perform one or many of the following functions. Store information about network resources and users, and track relationships. Organize resource access information in order to aid in the location of and access to other resources throughout the network. Provide location transparency, because resources are accessed through a directory rather than based on their physical location. Convert between logical resource names and physical resource addresses. Interact with Security services such as identification/authentication and access control services to maintain necessary access permissions and privileges. Provide single network logon to file and print resources; in certain cases, provide single network logon for network applications integrated with the directory services.

Distribute and synchronize directory information throughout the environment (for reliability and location-independent access).

Figure 12:
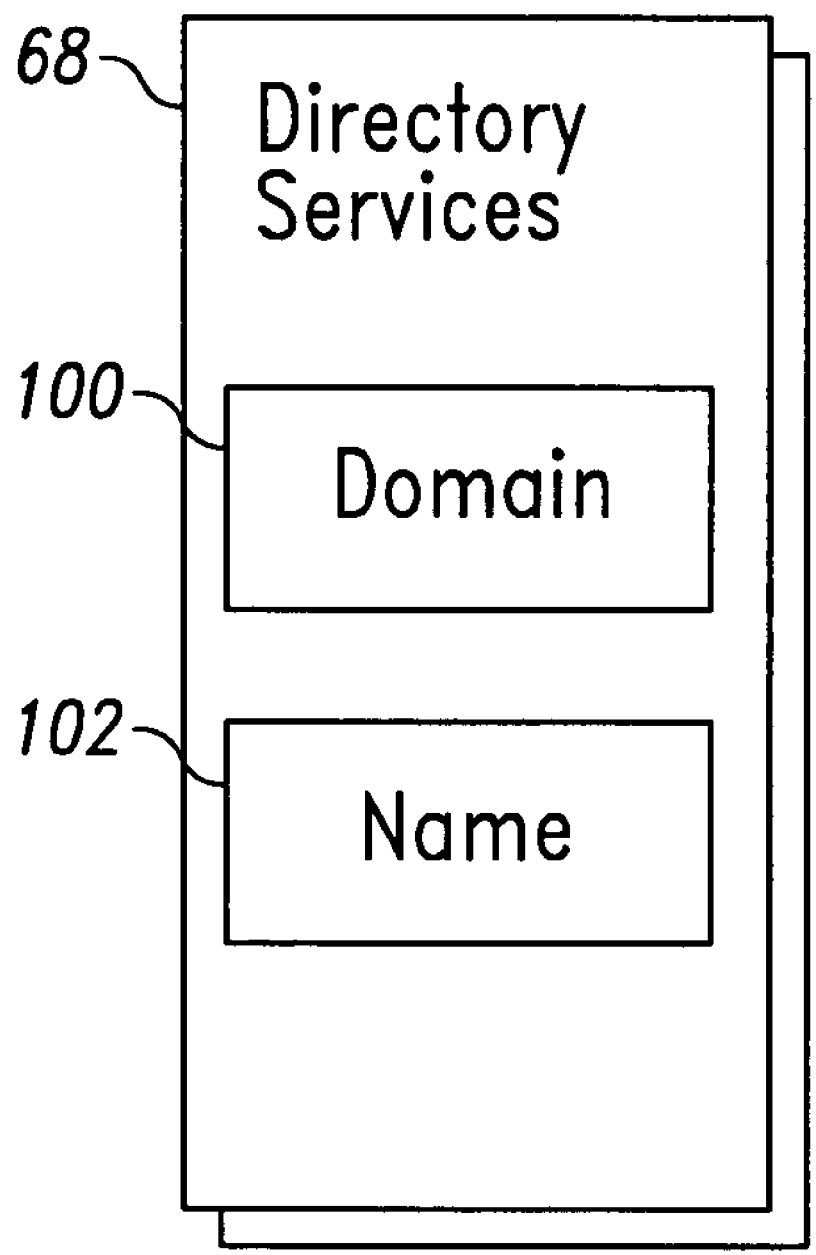
FIG. 12 illustrates the preferred directory service of the communication services architecture.

As illustrated in FIG. 12, the preferred directory services 68 are comprised of two subservices: name services 100 and domain services 102. The name service 100 creates a logical "pronounceable" name in place of a binary machine number. The name services 100 and the domain services 102 can be used by other communications services such as the file transfer services 70, the message services 60, and the terminal services 112 (described later). A name service 100 can be implemented on its own or as part of a full-featured directory service 68.

A network domain is a set of network nodes under common control (i.e., common security and logins, unified addressing, coordinated management, etc.). The domain services 102 manage these types of activities for the network nodes in a domain. Domain services 102 may be limited in their ability to support heterogeneous systems and in the ability to scale to support the enterprise. In the preferred netcentric computing system 12, seamless location of, and access to, resources, individuals, and applications is provided by the directory services 68. Emerging directory service technologies such as the Lightweight Directory Access Protocol (LDAP) may also be used in the present invention.

Referring back to FIG. 4, the virtual resource services 66 use applications to proxy or mimic the capabilities of specialized, network-connected resources. This allows a generic network node to emulate a specialized physical device. In this way, network users can interface with a variety of specialized resources. The preferred virtual resource services 66 include fax services 104, file sharing services 106, paging services 108, phone services 110, terminal services 112, printing services 114 and audio/video services 116.

The fax services 104 use applications that provide for the management of both inbound and outboard fax transmissions. If fax is used as a medium for communicating with customers or remote employees, inbound fax services may be required for centrally receiving and electronically routing faxes to the intended recipient. Outbound fax services can be as simple as supporting the sharing on the network of a single fax machine or group of machines for sending faxes.

The functionality the fax services 104 provide the virtual resource services 66 include the following: managing incoming faxes; receiving faxes via the telephone network; queuing faxes; routing and distributing faxes; displaying or printing faxes; managing outgoing faxes; generating faxes; queuing faxes; and transferring faxes via the telephone network. The fax services 104 can provide centrally managed faxing capabilities, thus eliminating the need for fax modems on every workstation. Although not illustrated, a fax server generally provides fax services to clients 14 such as receiving, queuing and distributing incoming faxes and queuing and sending outgoing faxes. Clients 14 can view faxes and generate faxes to be sent. Applications may compose and transfer faxes as part of notifying users or delivering information. For example, an application may use the fax services 104 to add customer-specific information to a delivery receipt form and fax the form to a customer.

The file sharing services 106 use applications that allow users to view, manage, read, and write to files that may be located on a variety of platforms in a variety of locations. In operation, the file sharing services 106 enable a unified view of independent file systems. The file sharing services 106 provide some or all of the following capabilities in the virtual resource services 66: transparent access, multi-user access, file access control, multi-platform access, integrated file directory, fault tolerance and scalability.

Transparent access provides the clients 14 with access to remote files as if they were local. Multi-user access provides for distribution and synchronization of files among multiple users, including file locking to manage access requests by multiple users. File access control provides for the use of security services (user authentication and authorization) to manage file system security. Multi-platform access provides clients 14 access to files located on various platforms (e.g., UNIX, NT, etc.).

An integrated file directory provides clients 14 with a logical directory structure that combines all accessible file directories, regardless of the physical directory structure. Fault tolerance is handled by the use of primary and replica file servers to ensure high availability of file systems. In addition, the file sharing services 106 are scalable because of the ability to integrate networks and distributed file systems of various sizes.

The paging services 108 use applications to provide the message formatting and display functionality that allows network nodes to interface with wireless paging systems. In operation, this service emulates the capabilities of one-way and two-way pagers. The paging services 108 allow can allow pages to be generated in various ways: e-mail messages to a specified mailbox; DTMF (touch tone) signaling to a voice response system; encoded digital messages transferred to a paging provider gateway; and messages transferred to a locally attached two-way wireless page.

The phone services 110 use applications to extend telephony capabilities to the netcentric computing system 12. For example, an application on a client 14 can place and receive telephone calls for the user. The phone services 110 may be used in customer care centers, help desks, or any other environment in which it is useful for a computer to replace a telephone handset.

During operation, the phone services 110 enable clients 14, servers 22, 26, 28, and specialized telephony nodes (PBXSs, ACDs, etc. (not illustrated)) to control the telephony environment through the following methods: call control; controls telephone features; controls recorded messages; manipulates real time call activities (e.g., make call, transfer, hold, conference, mute transfer, release, route call, call treatments, and digits collected); telephone status control; controls telephone status functions; logs in and out of the system; and sets ready, not ready, and make busy statuses for users.

The following are examples of some uses of the phone services 110 of the virtual resource services 66. PC telephony products allow desktop computers to act as conduits for voice telephone calls. Internet telephony products enable voice telephone calls (and faxing, voice mail retrieval, etc.) through the Internet. For example, an Internet telephony product can accept voice input into a workstation, translate it into an IP data stream, and route it through the Internet to a destination workstation, where the data is translated back into audio. Various desktop voice mail products enable clients 14, 20 to manage voice mail messages using a desktop computer.

The terminal services 112 use applications to allow a client to connect to a non-local host via a network and to emulate the profile (e.g., the keyboard and screen characteristics) required by the host application. Terminal services allow a client 14 to connect to a non-local host via a network and to emulate the profile (e.g., the keyboard and screen characteristics) required by the host application. For example, when a client application logs on to a server, the client 14 functions as a dumb terminal. The terminal services 112 receive user input and send data streams back to the host processor. If connecting from a PC to another PC, the client 14 might act as a remote control terminal (e.g., PC Anywhere).

The following are examples of terminal services that may be used in the present invention: Telnet: a simple and widely-used terminal emulation protocol that is part of the TCP/IP communications protocol. Telnet operates establishing a TCP connection with the remotely located login server, minicomputer, or mainframe. The client's keyboard strokes are sent to the remote machine while the remote machine sends back the characters displayed on the local terminal screen. 3270 emulation: emulation of the 3270 protocol that is used by IBM mainframe terminals. tn3270: a Telnet program that includes the 3270 protocol for logging onto IBM mainframes, which is part of the TCP/IP protocol suite.

X Window System allows users to simultaneous access applications on one or more UNIX servers and display results in multiple windows on a local display. Recent enhancements to X Window System include integration with the Web and optimization of network traffic (caching, compression, etc.). Remote control: while terminal emulation is typically used in host-based environments, remote control is a sophisticated type of client/server Terminal services. Remote control allows a client computer to control the processing on a remote desktop computer. The GUI on the client computer looks as if it is the GUI on the remote desktop. This makes it appear as if the remote applications are running on the client.

Another terminal service that may be used is rlogin. rlogin is a remote terminal service implemented under BSD UNIX. The concept behind rlogin is that it supports "trusted" hosts. This is accomplished by having a set of machines that share common file access rights and logins. The user controls access by authorizing remote login based on a remote hose and remote user name. This service is generally considered a security risk and avoided in most business system configurations.

The printing services 114 use applications to connect network workstations to shared printers so that various workstations can share printers. The administration of the print services 114 is usually handled by a print server (not illustrated). Depending on the size of the netcentric computing system 12 and the amount of resources the print server must manage, the print server may run on a dedicated machine or on a machine that performs other server functions. Print servers queue print jobs sent to network printers, which are stored in the print server's print buffer and then sent to the appropriate network printer as it becomes available. The print services 114 can also provide the client 14 with information, including print job status, and can manage in-progress print jobs.

The audio/video services 116 use applications that allow nodes to interact with multimedia data streams. These services may be implemented as audio only, video only, or combined audio/video. The audio/video services 116 allow components to interface with audio streams such as the delivery of music or radio content over data networks. Video services 116 allow components to interface with video streams such as video surveillance. Video services 116 can add simple video monitor capabilities to a computer, or they can transform the computer into a sophisticated video platform with the ability to generate and manipulate video.

Video and audio content is often delivered simultaneously. This may be accomplished by transferring separate audio and video streams or by transferring a single interleaved stream. Examples include video conferencing and television (traditional or interactive). The audio/video services 116 can include the following functionality: streaming content (audio, video, or both) to end users; managing buffering of data stream to ensure uninterrupted viewing/listening; performing compression and decompression of data; managing communications protocols to ensure smooth delivery of content; and managing library of stored content and/or manages generation of live content.

Audio/Video services draw upon lower-level services such as streaming (see Streaming Messaging services) and IP Multicast (see Packet Forwarding/Internetworking services) to efficiently delivery content across the network. Wireless short messaging (i.e., paging) can be implemented through wireless systems such as paging networks, GSM voice/data networks, PCS voice/data networks, and dedicated wireless data networks.

Referring to FIG. 3, overall, the communication services layer 46 provides the foundation for netcentric applications enabling client/server and virtual resource communications. Selecting the appropriate communication services, services that meet the business and applications requirements of a particular enterprise, is a key step to ensuring a successful communication services architecture 10. In addition, ensuring the transport services layer 48 supports the selected communication services layer 46 is also important.

The transport services layer 48 is the portion of the communication services architecture 10 that provides the movement of information across a network. While the communications fabric layer 44 includes all the hardware, software, and service between the client 14 and servers 22, 26, 28, the transport services layer 48 plays a key role in performing network functions across the enterprise or between enterprises. As illustrated in FIG. 3, the transport services layer 48 operates across all platforms and plays an integral role in allowing the client 14, by means of the communications fabric layer 44, to communicate and share information with the servers 22, 26, 28, or vice versa.

Figure 13:
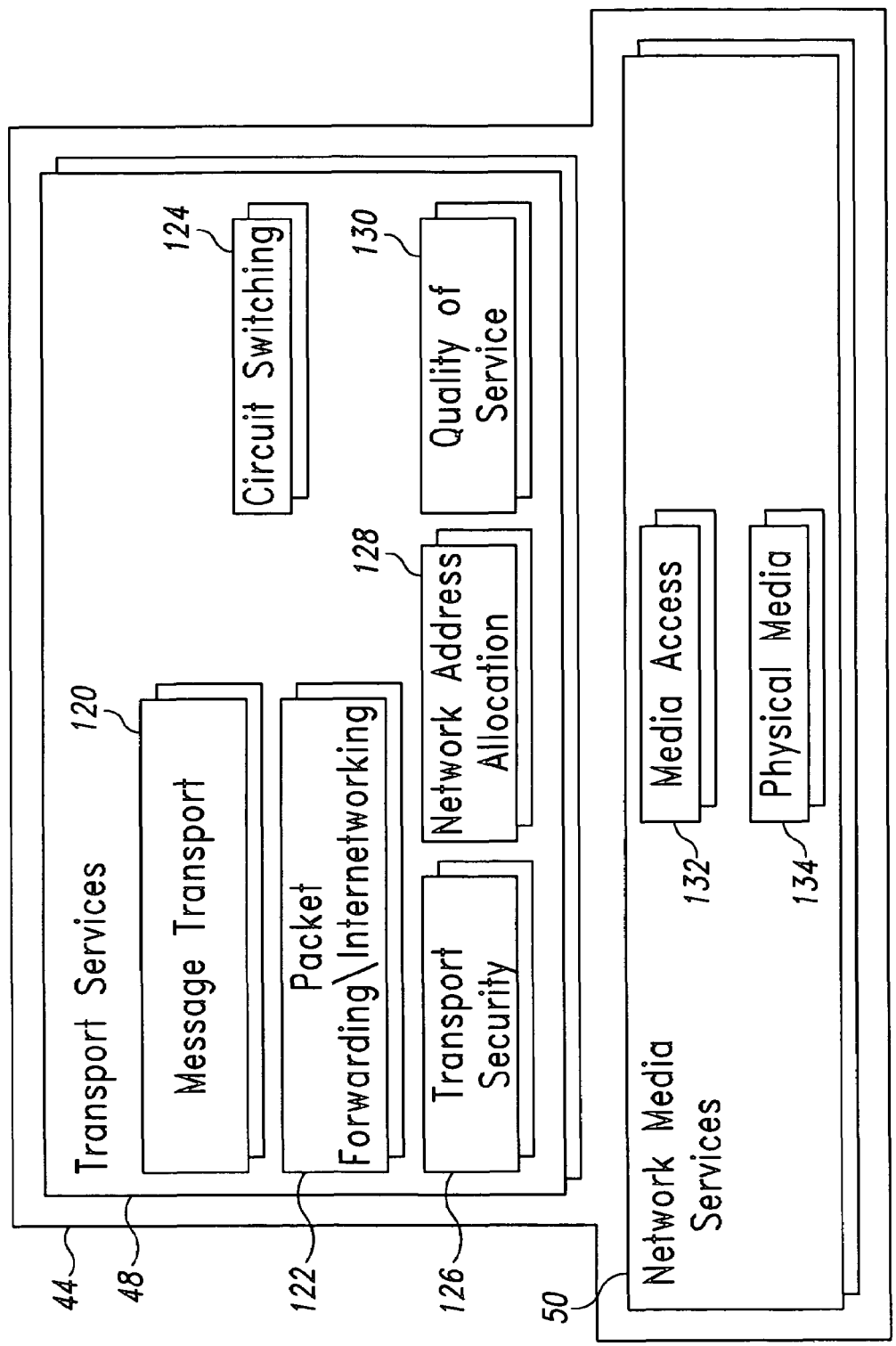
FIG. 13 illustrates a portion of the communication fabric layer that depicts the transport services and the network media services.

As illustrated in FIG. 13, which illustrates a portion of the communications fabric layer 44 depicted in FIG. 3, the transport services layer 48 includes the following: message transport services 120, packet forwarding/Internetworking services 122, circuit switching services 124, transport security services 126, network address allocation services 128, and quality of service services 130.

The message transport services 120 are applications that are responsible for the end-to-end delivery of messages. In the preferred embodiment, the message transport services 120 include functionalities such as end-to-end data transfer, connection control, reliable transfer, flow control, and multiplexing. The message transport services 120 format messages for sending and confirms the integrity of received messages. In addition, the message transport services 120 may establish end-to-end (client-server) connections and track addresses and other associated information for the connection. The message transport service 120 may manage reliable delivery of messages through the use of acknowledgments and retransmissions.

The message transport services 120 may allow the client 14 to govern the rate at which the sender transfers data, thereby provided flow control. The message transport services 120 may define multiple addresses or ports within a single network node, allowing multiple processes on the node to have their own communication paths.

It is important to note that some message transport services do not implement all of the listed functionalities.

For example, the UDP protocol does not offer connection control or reliable transfer. The following are examples of protocols that provide message transport: SPX (Sequenced Packet exchange); TCP (Transmission Control Protocol); UDP (User Datagram Protocol); NetBIOS/NetBEUI (Network Basic Input/Output System/NetBIOS Extended User Interface); APPC (Advanced Program-to-Program Communications); and Apple Talk.

The packet forwarding/Internetworking services 122 are applications that transfer data packets and manage the path that data takes through the netcentric computing system 10. The services include functionalities such as fragmentation/reassembly, addressing, routing, switching and multicasting.

The packet forwarding/Internetworking service 122 divides an application message into multiple packets of a size suitable for network transmission. The individual packets include information to allow the receiving node (i.e.—client or server) to reassemble them into the message. The service also validates the integrity of received packets and buffers, reorders and reassembles packets into a complete message.

During operation, the packet forwarding/Internetworking service 122 encapsulates packets with addressing information. The packet forwarding/Internetworking service 122 can maintain routing information (a view of the network topology) that is used to determine the best route for each packet. Routing decisions are made based on the cost, percent utilization, delay, reliability and similar factors for each possible route through the network.

Switching is the process of receiving a packet, selecting an appropriate outgoing path, and sending the packet. Switching is performed by routers and switches within the communications fabric. As known in the art, switching can be implemented in several ways. For some network protocols (e.g., TCP/IP), routers draw upon dynamic routing information to switch packets to the appropriate path. This capability is especially important when connecting independent networks or subnets. For other network protocols (e.g., Ethernet, Token Ring), switching simply directs packets according to a table of physical addresses. The switch can build the table by "listening" to network traffic and determining which network nodes are connected to which switch port. Some protocols such as Frame Relay involve defining permanent routes (permanent virtual circuits, or PVCs) within the network. Because frame relay is switched based upon PVCs, routing functionality is not required.

The packet forwarding/Internetworking service 122 may support multicasting, which is the process of transferring a single message to multiple recipients at the same time. Multicasting allows a sender to transfer a single copy of the message to the communications fabric, which then distributes the message to multiple recipients.

The following are examples of protocols that provide packet forwarding/Internetworking: IP (Internet Protocol); IP Multicast) (emerging standard that uses a predefined set of IP addressed to instruct network routers to deliver each packet to all users involved in a multicast session); IPX (Internetwork Packet Exchange); ATM (Asynchronous Transfer Mode); Frame Relay; and X.25.

The following are examples of common network components that perform packet forwarding/Internetworking services 122: routers; switches; ATM switches, Frame Relay switches, IP switches, Ethernet switches, etc. The following are examples of protocols that maintain routing information tables within routers: distance vector protocols, link-state protocols and policy routing protocols.

In distance vector protocols each router periodically informs neighboring routers as to the contents of routing table (destination addresses and routing metrics); routing decisions are made based on the total distance and other "costs" for each path: IP and IPX Routing Information Protocols (RIP); AppleTalk Routing Table Management Protocol (RTMP); Cicso's Interior Gateway Routing Protocol (IGRP) and Enhanced IGRP.

In link-state protocols each router periodically broadcasts changes to the routers directly on adjacent networks: Open Shortest Path First (OSPF); ISO's Intermediate System to Intermediate System (IS—IS); Novell's NetWare Link Services Protocol (NLSP). Policy routing protocols allow Internet backbone routers to accept routing information from neighboring backbone providers on the basis of contracts or other non-technical criteria; routing algorithms are distance vector: Border Gateway Protocol (BGR) and Interdomain Routing Protocol (IDR).

The circuit switching services 124 are applications that establish physical circuits for the transfer of such things as circuit-switched voice, fax, and video. Circuit switching services 124 use an end-to-end physical connection between the sender and the receiver that lasts for the duration of the "call" transferred through brief, temporary, logical connections between nodes. The circuit switching services 124 provide the following functionality in the preferred embodiment of the invention: establishing an end-to-end path for circuits (may involve multiple intermediate nodes/switches) and managing the end-to-end path (quality, billing, termination, etc.). The following are examples of circuit switching devices that may be used in the present invention: analog dial-up telephone circuit; cellular telephone circuit; ISDN (Integrated Services Digital Network).

The transport security services 126 are applications and devices that perform encryption and filtering of traffic being passed over the transport services 48. Encryption within the transport security services 126 is performed by encrypting packets generated by higher level services (e.g., message transport 120) and encapsulating them in lower level packets (e.g., packet forwarding/Internetworking 122). Note that encryption can also occur within the communications services layer 46 or the network media services layer 50. Encryption within the transport services layer 48 has the advantage of being independent of both the application and the transmission media, but it may make network monitoring and troubleshooting activities more difficult. The following standards support transport-layer encryption: Point-to-Point Tunneling Protocol and Layer 2 Tunneling Protocol.

Network traffic can be controlled at the transport services layer 48 by filtering data packets based on source and/or destination addresses and network service in the transport security services 126. This ensures that only authorized data transfers can occur. This filtering is one of the roles of a packet filtering firewall. As generally known in the art, a firewall is a system that enforces an access control policy between a trusted internal network and an untrusted external network.

The network address allocation services 128 are applications that manage the distribution of addresses to network nodes of the netcentric computing system 12. This provides more flexibility compared to having all nodes assigned static addresses. This service assigns addresses to nodes when they initially power on and connect to the network. The following are examples of standards that implement network address allocation services 128 and allow a network node (i.e., client 14) to ask a central resource (i.e., server 22, 26, 28) for the node's network address (e.g., IP address): DHCP (Dynamic Host Configuration Protocol) and BootP (Bootstrap Protocol).

The quality of service services 130 are applications designed to deliver a defined network throughout for designated traffic by allocating dedicated bandwidth, prioritizing data traffic, and managing traffic flow. Different types of network traffic (e.g., data, voice and video) have different quality of service requirements. For example, data associate with video-conferencing sessions is useless if it is not delivered "on time." On the other hand, traditional best-effort data services, such as file or e-mail transfer, are not affected by variations in latency.

Several specialized communications protocols may be used to provide guaranteed quality of service. Asynchronous Transfer Mode (ATM) is a connection-oriented wide area and local area networking protocol that delivers quality of service services 130 on a per-connection basis. Quality of service is negotiated as part of the initial connection set up and as network conditions change. Because of the small size of ATM data cells, quality of service can be better managed, compared to protocols such as Ethernet that have large frames that can tie up network components. For ATM to deliver quality of service to applications, ATM must be used end to end.

Resource Reservation Protocol (RSVP) allows applications to reserve router bandwidth for delay-sensitive IP traffic. With RSVP, quality of service is negotiated for each application connection. RSVP enables the network to reserve resources from end to end, using frame relay techniques on frame relay networks, ATM techniques on ATM, and so on. In this way, RSVP can achieve quality of service across a variety of network technologies, as long as all intermediate nodes are RSVP capable.

IP Stream Switching improves network performance, but does not guarantee quality of service. IP switching can increase network throughput for streams of data by combining IP routing software with ATM switching hardware. With IP switching, an IP switch analyzes each stream of packets directed from a single source to a specific destination and classifies it as short- or long-lived. Long-lived flows are assigned ATM virtual channels (VCs) that bypass the IP router and move through the switching fabric at the full ATM line speed. Short-lived flows continue to be routed through traditional store-and-forward transfer.

Like IP switching, tag-switching also improves network throughput for IP data streams. Tag switching aggregates one or more data streams destined for the same location and assigns a single tag to all associated packets. This allows routers to more efficiently transfer the tagged data. Tag switching is also known multi-protocol label switching. Data prioritization improves network performance for prioritized application traffic, but does not guarantee quality of service.

Although not an example of end-to-end quality of service, various network components can be configured to prioritize their handling of specified types of traffic. For example, routers can be configured to handle legacy mainframe traffic (SNA) in front of other traffic (e.g., TCP/IP). A similar technique is the use of prioritized circuits within frame relay, in which the frame relay network vendor assigns different priorities to different permanent virtual circuits. Prioritization techniques are of limited effectiveness if data must also pass through network components that are not configured for prioritization (e.g., network components run by third-party network providers).

As illustrated in FIG. 13, the preferred network media services 50 of the communications fabric layer 44 includes media access services 132 and physical media services 134. The network media services 50 provide final framing of data for interfacing with the client 14 or node and the ability to receive, interpret, and act on signals that are received by the communications fabric layer 44. The network media services 50 are capable of transferring data throughout the netcentric computing system 12, as illustrated in FIG. 3.

In the preferred embodiment, the media access services 132 manage the low-level transfer of data between network nodes. The media access services 132 include applications that perform functions such as physical addressing, packet transfer, shared access, flow control, error recovery, and encryption. In physical addressing the media access services 132 encapsulate packets with physical address information used by the data link protocol (e.g., Ethernet and Frame Relay). During packet transfer, the media access service 132 uses the data link communications protocol to frame packets and transfer them to another computer on the same network/subnetwork.

The media access services 132 provide a method for multiple network nodes to share access to a physical network. Shared access schemes include CSMA/CD, token passing and multiplexing. CSMA/CD (Carrier Sense Multiple Access with Collision Detection) is a method by which multiple nodes can access a shared physical media by "listening" until no other transmissions are detected and then transmitting and checking to see if simultaneous transmission occurred. Token passing is a method of managing access to a shared physical media by circulating a token (a special control message) among nodes to designate which node has the right to transmit.

Multiplexing is a method of sharing physical media among nodes by consolidating multiple, independent channels into a single circuit. The independent channels (assigned to nodes, applications or voice calls) can be combined by time-division multiplexing and frequency division multiplexing. Time division multiplexing (TDM) is a method in which the use of a circuit is divided into a series of time slots, and each independent channel is assigned its own periodic slot. In frequency division multiplexing (FDM)—each independent channel is assigned its own frequency range, allowing all channels to be carried simultaneously.

The media access service 132 manages the flow of data to account for differing data transfer rates between devices. For example, flow control would have to limit outbound traffic if a receiving machine or intermediate node operates at a slower data rate, possibly due to the use of different network technologies and topologies or due to excess network traffic at a node.

The media access services 132 perform error recovery, which is the capability to detect and possibly resolve data corruption that occurs during transmission. Error recovery involves the use of checksums, parity bits, etc. In addition, the media access service 132 may perform encryption. (Note that encryption can also occur within the communications services layer 46 or the transport services layer 48.) Within the network media services layer 50, encryption can occur as part of the data link protocol (e.g., Ethernet, frame relay). In this case, all data is encrypted before it is placed on the wire. Such encryption tools are generally hardware products. Encryption at this level has the advantage of being transparent to higher-level services.

The following are examples of media access protocols that may be used in the netcentric computing system.

Ethernet; Token Ring; FDDI (Fiber Distributed Data Interface); Portions of the ATM (Asynchronous Transfer Mode) standard; HDLC (High-level Data Link Control)/SDLC (Synchronous Data Link Control); LAP-B (Link Access Procedure—Balanced); T-carrier, E-carrier (e.g., T1, T3, E1, E3); TDM and FDM (Time Division Multiplexing and Frequency Division Multiplexing; used on T-carriers, etc.); SONET (Synchronous Optical Network), SDH; PPP (Point-to-Point Protocol), SLIP (Serial Line Internet Protocol); V.32, V.34, V.34 bis, etc.; RS-232, EIA-232; and TDMA and FDMA (Time Division Multiple Access and Frequency Division Multiple Access; used on wireless links).

Specialized services convert between addresses in the media access services 132 (i.e., physical addresses like Ethernet) and the packet forwarding /Internet-working services 22 (i.e., network addresses like IP). Address Resolution Protocol (ARP) allows a node to obtain the physical address for another node when only the IP address is known. Reverse Address Resolution Protocol (RARP) allows a node to obtain the IP address for another node when only the physical address is known.

The physical media services 134 include both the physical connectors and the physical media (wired or wireless) that are used by clients 14 to connect with, and use, the resources of the netcentric computing system 12. The physical media services 134 are divided into two categories: physical connectors and physical media (wired or wireless).

The following are examples of wiring connectors used to connect network nodes to physical media: RJ-11, RJ-45; BNC; DB-9, DB-25; and fiber optic connectors. The following are examples of wired physical media: twisted pair wiring; shielded twisted pair wiring; coaxial cable; fiber optic cable; and four-pair voice-grade wiring. The following are examples of wireless physical media: cellular antennas and the associated radio frequencies; wireless local area network antennas and the associated radio frequencies; and satellite antennas and the associated radio frequencies.

Without the network media services 50 (which was compared earlier to the interconnected train tracks, signals and switches), information would not be capable of traveling to its intended destinations. While this infrastructure is a complex network of numerous interconnected copper wires, fiber optics cables and radio antennas, continued change in network media services is likely to be slow. Those skilled in the art would recognize that various methods of conducting communication exist and will continue to develop. These methods may be readily incorporated into the preferred embodiment of the present invention.

While the invention has been described in its currently best known modes of operation and embodiments, other modes and embodiments of the invention will be apparent to those skilled in the art and are contemplated. For other features, advantages and combinations of the present invention refer to U.S. provisional application Ser. No. 60/156, 962, entitled NETCENTRIC AND CLIENT/SERVER COMPUTING, which is herein incorporated by reference, in its entirety.

What is claimed is:

1. A method of providing a communication services architecture for a netcentric computing system, comprising:
sharing a communication services layer including communication services, communication security services, virtual resource services and directory services with at least one client and a web server;
transporting data between said client and said web server with a transport services layer that includes message transport services, packet forwarding/Internetworking services, circuit switching services, transport security services, network address allocation services and quality of service services; and
interconnecting said client with said web server with a network media services layer including media access services and physical media services.

2. The method of claim 1, wherein said communication services include core messaging services and specialized messaging services.

3. The method of claim 2, wherein said core messaging services transfer information from one application to another application in said netcentric computing system.

4. The method of claim 2, wherein said core messaging services are selected from the group consisting of file transfer services, remote procedure call services, message-oriented services or streaming services, or combinations thereof.

5. The method of claim 4, wherein said file transfer services are selected from the group consisting of file transfer protocol services, hyper-text transfer protocol services, secure hyper-text transfer protocol services or file transfer and access management services, or combinations thereof.

6. The method of claim 4, wherein said streaming services use a streaming protocol selected from the group consisting of real-time streaming protocol, real-time transport protocol and real-time control protocol.

7. The method of claim 2, wherein said specialized messaging services are selected from the group consisting of E-mail messaging services, database access messaging services, object request broker messaging services, computer-telephone integration messaging services, electronic data interchange messaging services or legacy integration services, or combinations thereof.

8. The method of claim 1, wherein said communication security services are selected from the group consisting of encryption services, identification/authorization services or access control services, or combinations thereof.

9. The method of claim 8, wherein said identification/authentication services are selected from the group consisting of basic ID/authentication, ID/password encryption, digital certificates, digital signatures, hardware tokens, virtual tokens or biometric identification, or combinations thereof.

10. The method of claim 1, wherein said directory services include name services and domain services.

11. The method of claim 1, wherein said virtual resource services are selected from the group consisting of fax services, file sharing services, paging services, phone services, terminal services, printing services or audio/video services, or combinations thereof.

12. The method of claim 11, wherein said terminal services are selected from the group consisting of Telnet, 3270 emulation, tn3270, X Window System, remote control and rlogin.

13. A communication services architecture for a netcentric computing system, comprising:
a web server connected with at least one client;
a communication layer located on said client and said web server, wherein said communication layer includes a communication services layer and a transport layer;
a communication fabric layer located on said client and said web server, wherein said communication fabric layer includes said communication services layer, said transport layer and a network media layer;

wherein said communication services layer includes communication services, communication security services, virtual resource services and directory services;

wherein said transport layer includes message transport services, packet forwarding/Internetworking services, circuit switching services, transport security services, network address allocation services and quality of service services and wherein said network media services; and wherein said network media layer includes media access services and physical media services.

14. The communication services architecture of claim 13, wherein said communication services include core messaging services and specialized messaging services.

15. The communication services architecture of claim 14, wherein said core messaging services are selected from the group consisting of file transfer services, remote procedure call services, message-oriented services or streaming services, or combinations thereof.

16. The communication services architecture of claim 15, wherein said file transfer services are selected from the group consisting of file transfer protocol, hyper-text transfer protocol, secure hyper-text transfer protocol and file transfer or access management, or combinations thereof.

17. The communication services architecture of claim 15, wherein said streaming services use a streaming protocol selected from the group of protocols consisting of real-time streaming protocol, real-time transport protocol and real-time control protocol.

18. The communication services architecture of claim 14, wherein said specialized messaging services are selected from the group consisting of E-mail messaging services, database access messaging services, object request broker messaging services, computer-telephone integration messaging services, electronic data interchange messaging services or legacy integration messaging services, or combinations thereof.

19. The communication services architecture of claim 13, wherein said communication security services are selected from the group consisting of encryption services, identification/authentication services or access control services, or combinations thereof.

20. The communication services architecture of claim 19, wherein said identification/authentication services are selected from the group consisting of basic ID/authentication, ID/password encryption, digital certificates, digital signatures, hardware tokens, or virtual tokens and biometric identification, or combinations thereof.

21. The communication services architecture of claim 13, wherein said directory services include name services and domain services.

22. The communication services architecture of claim 13, wherein said virtual resource services are selected from the group consisting of fax services, file sharing services, paging services, phone services, terminal services, printing services or audio/video services, or combinations thereof.

23. The communication services architecture of claim 22, wherein said terminal services are selected from the group consisting of Telnet, 3270 emulation, tn3270, X Window System, remote control and rlogin.

* * * * *

UNITED STATES PATENT AND TRADEMARK OFFICE
CERTIFICATE OF CORRECTION

PATENT NO.         : 7,068,680 B1                                              Page 1 of 1
APPLICATION NO. : 09/675232
DATED              : June 27, 2006
INVENTOR(S)       : John K. Kaltenmark, Michael W. Alber and William M. Gilliland It is certified that error appears in the above-identified patent and that said Letters Patent is hereby corrected as shown below:

<u>Column 16</u>
Line 25, delete the word "allow" before the word "can".

<u>Column 19</u>
Line 56, delete the ")" (parenthetical mark) after the word "Multicast".

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 7,068,680 B1                                        Page 1 of 1
APPLICATION NO. : 09/675232
DATED              : June 27, 2006
INVENTOR(S)        : John K. Kaltenmark, Michael W. Alber and William M. Gilliland It is certified that error appears in the above-identified patent and that said Letters Patent is hereby corrected as shown below:

<u>Column 16</u>
Line 25, delete the word "allow" before the word "can".

<u>Column 19</u>
Line 56, delete the ")" (parenthetical mark) after the word "Multicast".

Signed and Sealed this

Nineteenth Day of December, 2006

JON W. DUDAS
*Director of the United States Patent and Trademark Office*